(12) United States Patent
Tan

(10) Patent No.: US 9,890,844 B2
(45) Date of Patent: Feb. 13, 2018

(54) OPENABLE FORCIPATE GEAR MECHANISM, FORCIPATE GEAR OPEN-CLOSE MECHANISM, AND WINDING MACHINE

(71) Applicant: NEWONDER SPECIAL ELECTRIC CO., LTD, Beijing (CN)

(72) Inventor: Yong Tan, Beijing (CN)

(73) Assignee: NEWONDER SPECIAL ELECTRIC CO., LTD., Beijing (CN)

( * ) Notice: Subject to any disclaimer, the term of this patent is extended or adjusted under 35 U.S.C. 154(b) by 381 days.

(21) Appl. No.: 14/766,517

(22) PCT Filed: Feb. 7, 2013

(86) PCT No.: PCT/CN2013/000132
§ 371 (c)(1),
(2) Date: Nov. 11, 2015

(87) PCT Pub. No.: WO2014/121420
PCT Pub. Date: Aug. 14, 2014

(65) Prior Publication Data
US 2016/0061309 A1  Mar. 3, 2016

(51) Int. Cl.
*F16H 55/17* (2006.01)
*H01F 41/06* (2016.01)
*B65H 81/00* (2006.01)

(52) U.S. Cl.
CPC ............ *F16H 55/17* (2013.01); *B65H 81/00* (2013.01); *H01F 41/06* (2013.01)

(58) Field of Classification Search
CPC .......... B65H 81/00; F16H 55/17; H01F 41/06
See application file for complete search history.

(56) References Cited

U.S. PATENT DOCUMENTS

| 2,341,650 | A | | 2/1944 | Quinlan | |
|---|---|---|---|---|---|
| 2,394,028 | A | * | 2/1946 | Volsk | H01F 17/02 140/92.2 |
| 2,602,598 | A | * | 7/1952 | Jensen | H01M 2/18 242/437.4 |

FOREIGN PATENT DOCUMENTS

| CN | 2292322 Y | 9/1998 |
|---|---|---|
| CN | 101012856 A | 8/2007 |

(Continued)

OTHER PUBLICATIONS

International Search Report dated Nov. 21, 2013 from PCT/CN2013/000132, 9 pages.

(Continued)

*Primary Examiner* — Emmanuel M Marcelo
(74) *Attorney, Agent, or Firm* — Ohlandt, Greeley, Ruggiero & Perle, LLP

(57) ABSTRACT

A forcipate gear open-close mechanism comprises a circular base spliced by two parts, an annular gear spliced by two parts, and an open-close device for driving the circular base and the annular gear to open or close. An annular guide rail formed by splicing is arranged on the circular base; the annular gear is mounted on the annular guide rail; and a power transmission device drives the annular gear to rotate along the annular guide rail. The annular gear and the circular ring-shaped base are each spliced by two parts; therefore, the gear mechanism can be clamped on an iron core conveniently, and a coil can be wound on a three-dimensional iron core conveniently. Moreover, the gear mechanism can not only be clamped on an iron core, but also be clamped on a columnar iron core.

17 Claims, 23 Drawing Sheets

(56) References Cited

FOREIGN PATENT DOCUMENTS

| | | |
|---|---|---|
| CN | 201517600 U | 6/2010 |
| CN | 101819874 B | 10/2011 |
| FR | 2 939 483 A1 | 6/2010 |
| JP | 62-88780 A | 4/1987 |

OTHER PUBLICATIONS

Extended European Search Report dated Jan. 5, 2017 for European application No. 13874755.5.

* cited by examiner

OPENABLE FORCIPATE GEAR MECHANISM, FORCIPATE GEAR OPEN-CLOSE MECHANISM, AND WINDING MACHINE

TECHNICAL FIELD

The disclosure relates to a forcipate gear mechanism, a forcipate gear open-close mechanism equipped with the forcipate gear mechanism, and a winding machine equipped with the forcipate gear open-close mechanism.

BACKGROUND

At present, with the rapid development of mechanical automation, the transformer manufacturers are also increasingly adopting automatic machines for the production to ensure more precise and rapid manufacture of transformers. Furthermore, the mechanical equipment for production also evolves to be more simplified and user friendly. The transformer winding machine with the three-dimensional iron core of the prior art was designed to ensure the coil to be directly wound on the iron core. Therefore, how to effectively clamp the iron core during the winding process becomes an integral part of the design of the winding machine. Chinese patent for Utility Model No. ZL97217186.X, announced on Sep. 23, 1998, discloses a ring-type three-phase transformer winding machine, wherein the drum mechanism is composed of a roller and a gear. Each of two ends of the roller is equipped with a combined gear wherein the combined gear at the right end is composed of three gears and the combined gear at the left end is composed of two gears. The drum mechanism is positioned on one of posts of the ring-type three-phase transformer iron core, and is conveyed into the spatial center of the locating device through the progressive iron core advancing mechanism. The gear of the drum mechanism is meshed with the corresponding gear of the locating mechanism. The above technical solution is inconvenient for iron core winding and is complicated.

SUMMARY

The technical problem to be solved by the invention is to overcome the disadvantages in the prior art and to provide a forcipate gear mechanism, a forcipate gear open-close mechanism and a winding machine, which can be clamped on the iron core and columnar iron core and thus be used for more extensive application, and reduce effectively friction between the annular gear and the guide rail, and extend the service life.

A forcipate gear mechanism according to the invention is essentially based on the technical solution that the mechanism includes: a circular base spliced by two parts, wherein the circular base is provided with an annular guide rail which is spliced; and an annular gear spliced by two parts, wherein the annular gear is mounted on the guide rail and rotates along the guide rail.

The forcipate gear mechanism of the invention can comprise he following additional technical features.

The circular base, the annular guide rail and the annular gear are spliced by two semicircular parts, respectively; splicing joints of the circular base, the annular guide rail and the annular gear coincide with each other; and the annular guide rail is formed as a rolling guide rail or a slide guide rail.

The annular guide rail includes an arc-shaped connecting frame positioned on the circular base and a plurality of bearings mounted in the arc-shaped connecting frame and distributed along a circumference; the annular gear is formed with an annular groove; and the groove is provided at outer and inner rings thereof with slots into which the bearings are clipped.

The annular guide rail is formed of two semicircular guide rails; and the annular gear is provided with an annular groove which is connected with the annular guide rail.

The annular guide rail includes an arc-shaped support, which is provided with an annular ball backflow channel and balls positioned in the annular ball backflow channel; the annular gear is provided with an groove; and the groove is provided at inner and outer rings thereof with slots into which the balls are positioned.

The annular gear is provided at an outer ring thereof with engaging teeth and at an inner ring thereof with a connecting portion suitable for connecting with external parts.

A forcipate gear open-close mechanism according to the invention is essentially based on the technical solution that the mechanism includes a forcipate gear mechanism, an opening and closing device for driving the forcipate gear mechanism, and a power transmission device. The forcipate gear mechanism includes: a circular base spliced by two parts, wherein the circular base is provided with an annular guide rail which is spliced; and an annular gear spliced by two parts, wherein the annular gear is mounted on the guide rail and rotates along the guide rail.

The forcipate gear open-close mechanism of the invention can also comprise the following technical features.

The opening and closing device includes: two connecting arms connected with the base spliced by two parts; a fixing plate with which the connecting arms articulate; and a pushrod connected with the connecting arms and pushing the connecting arms to move.

The fixing plate is provided with a drive motor and a screw driven by the drive motor; the pushrod is provided at a central part thereof with a drive nut connected with the screw and at ends thereof with bearings; the connecting arms are provided with arc-shaped slots in which the bearings are positioned; and the ends of the pushrod are connected with the arc-shaped slots through the bearings and slide along the arc-shaped slots.

The power transmission device includes: a driving gear formed of two plate gears mounted on the fixing plate; and two driven gears mounted on the connecting arms, wherein one of the two plate gears has a rotation adjusting and locking structure, the two plate gears are engaged with the two driven gears respectively, and the two driven gears are engaged with the annular gear respectively.

The forcipate gear open-close mechanism further includes three structures for detecting and locking open and close locations, which are connected with the driving gear and the two driven gears respectively; each of the structures for detecting and locking open and close locations includes a locking wheel, a locking member for locking the locking wheel, and a mandrel controlling the movement of the locking member; the locking wheel is provided with a notch and the locking member is provided with a hook; the hook is clipped into the notch, when the splicing joints of the circular base, the annular guide rail, and the annular gear coincide with each other; and the mandrel is also connected with sensors.

The sensors comprise at least three sensors, one of which is provided at the splicing joint of the circular base, and the rest of which are distributed on the base along the circumference; and the sensors each include a shell fixed on the base, a trigger provided on the shell, and two sensitive switches triggered by the trigger.

A winding machine of the invention is essentially based on the technical solution that the winding machine includes a body and a forcipate gear open-close mechanism mounted on the body, wherein the forcipate gear open-close mechanism includes a forcipate gear mechanism, an opening and closing device for driving the forcipate gear mechanism, and a power transmission device, and wherein the forcipate gear mechanism includes a circular base spliced by two pans, wherein the circular base is provided with an annular guide rail which is spliced; and an annular gear spliced by two parts, wherein the annular gear is mounted on the guide rail and rotates along the guide rail.

The winding machine of the invention can comprise the following additional technical features.

The winding machine further includes a flexible power transmission mechanism which includes a first transmission arm connected with a power output shaft and a second transmission arm connected with a winding mechanism, ends of the first transmission arm and the second transmission arm being articulated.

Each of the first and second transmission arms des a connecting plate, a chain wheel set mounted on two ends of the connecting plate via a rotation shaft, and a chain connecting the chain wheel set; an articulating point of the first and second transmission arms is located at the chain wheel sets where the first and second transmission arms are connected; and a plurality of flexible power transmission mechanisms composes a multi-row structure.

The winding machine further includes a clamping mechanism, the clamping mechanism including two supports positioned on the body opposite to each other and iron core clamping assemblies positioned on the supports; a slide guide rail is provided between the supports and the body; and the two supports move relative to each other via the guide rail.

The forcipate gear mechanism of the invention, the open-close mechanism comprising such gear mechanism, and the winding machine comprising such open-close mechanism produce the benefits that the annular gear and circular base are spliced by two parts so as to facilitate the gear mechanism to be clamped on the iron core and the coil to be wound on the three-dimensional iron core; in addition, the gear mechanism of the invention can be applied more extensively to iron core coil winding of multiple types, thus effectively reducing the friction between the annular gear and the guide rail, reducing the abrasion and extending the service life; meanwhile, the mechanism is characterized by simple structure and low production cost, thus reducing the equipment investments by the enterprises and strengthening the stability and consistency between the relative supports. The invention is based on the central shaft-free solution that the sliding adjustment of supports is caused by the guide rail, thereby greatly reducing the clamping time for the three-dimensional iron core. Such a central shaft--free structure is suitable for different types of iron core, avoiding the interference of central shaft with the forcipate gear mechanism.

DETAILED DESCRIPTION

Hereinafter, reference will be made in detail to the disclosure with reference to the attached drawings.

As shown in FIGS. 1 to 8, a forcipate gear mechanism according to an embodiment of the disclosure includes a circular base 1 spliced by two parts and an annular gear 2 spliced by two parts. The circular base 1 is provided thereon with an annular guide rail 11 which is spliced. The annular gear 2 is mounted on the annular guide rail 11 and rotates along the annular guide rail 11. Because both the annular gear 2 and the circular base 1 are spliced by two parts, the annular gear 2 and the base 1 can open or close the two parts.

When the two parts are closed, the mechanism can be clamped on an iron core, and the annular gear 2 can rotate on the annular guide rail 11 on the circular base 1, so as to drive a reel capped on the iron core to rotate, thereby facilitating winding a coil on the iron core. The gear mechanism of this structure can be more extensively applied to multiple types of iron core structure. Surely, the annular gear 2 of this disclosure can also be applied to other purposes besides the iron core winding. For example, in the closed constructions where the gear is not suitable for be mounted, the openable annular gear mechanism of this disclosure can be used.

Figure 1:
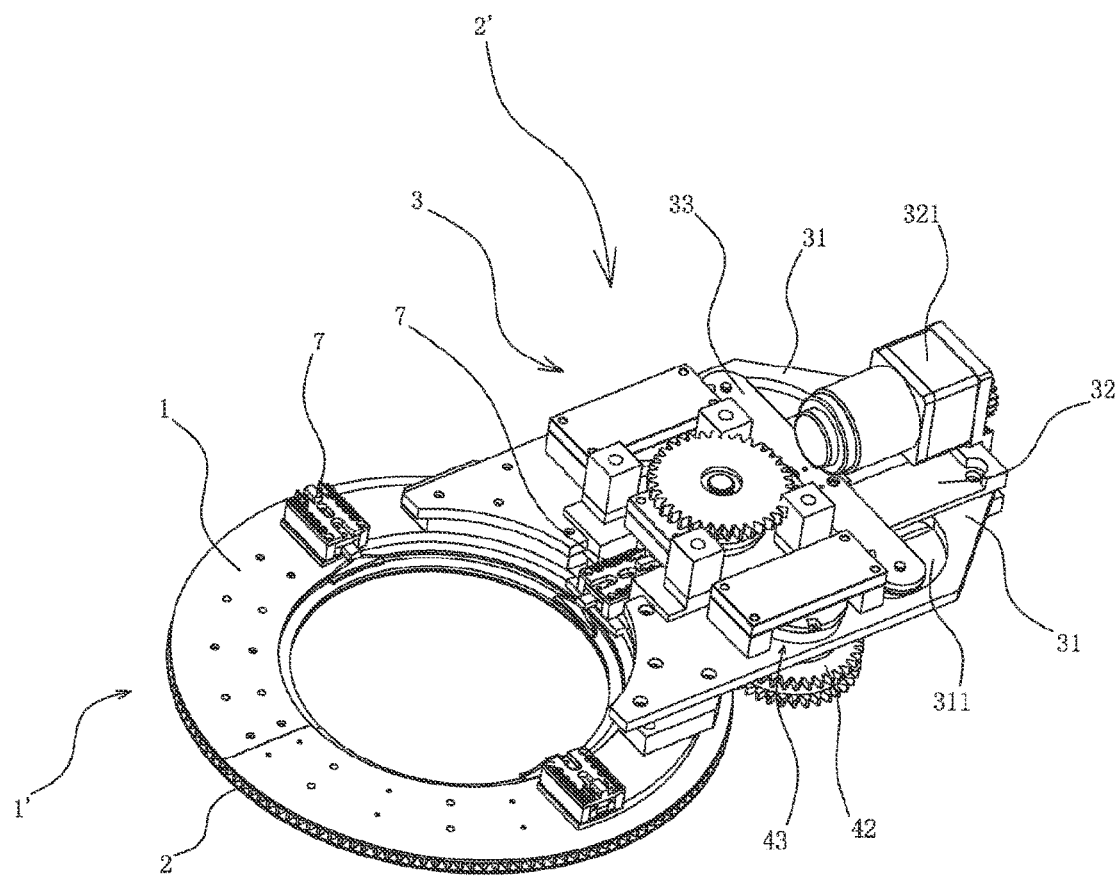
FIG. 1 is a perspective view showing a structure of the openable forcipate gear mechanism.
Figure 2:
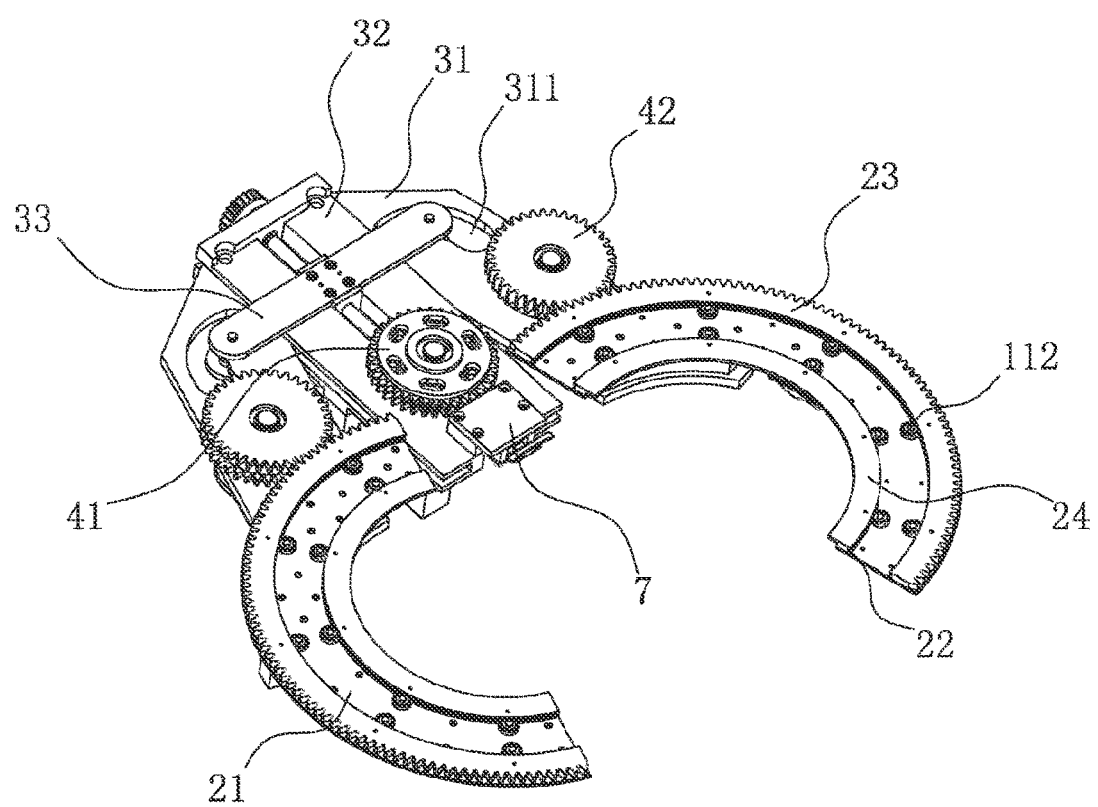
FIG. 2 is a view showing the openable forcipate gear mechanism of the disclosure in the open state.

Referring to FIG. 2, according to the openable forcipate gear mechanism of the present disclosure, respective splicing joints of the circular base 1, the annular guide rail 11 and the annular gear 2 coincide with each other. The circular base 1, the annular guide rail 11 and the annular gear 2 are spliced by two semicircular parts. Because the splicing joints of the circular base 1, the annular guide rail 11 and the annular gear 2 spliced by two parts coincide with each other, the forcipate gear mechanism of the present disclosure can be easily opened when the coil is not required to be wound.

Referring to FIG. 4 to FIG. 8, according to the openable forcipate gear mechanism of the present disclosure, the annular guide rail 11 is either a rolling guide rail or a slide guide rail, which can effectively reduce the friction between the annular gear and the guide rail, thus greatly reducing the abrasion between the components and extending the service life thereof.

The disclosure provides three forms of the design structure of the annular guide rail.

Figure 4:
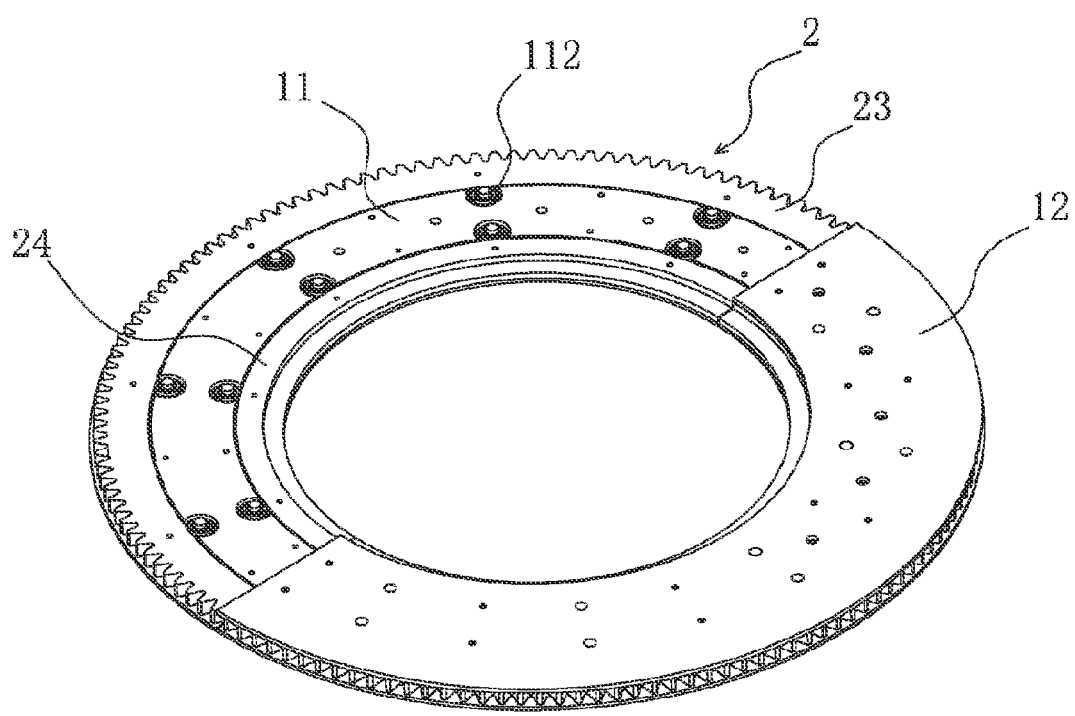
FIG. 4 is a view showing the openable forcipate gear mechanism having a first form of an annular guide rail.
Figure 5:
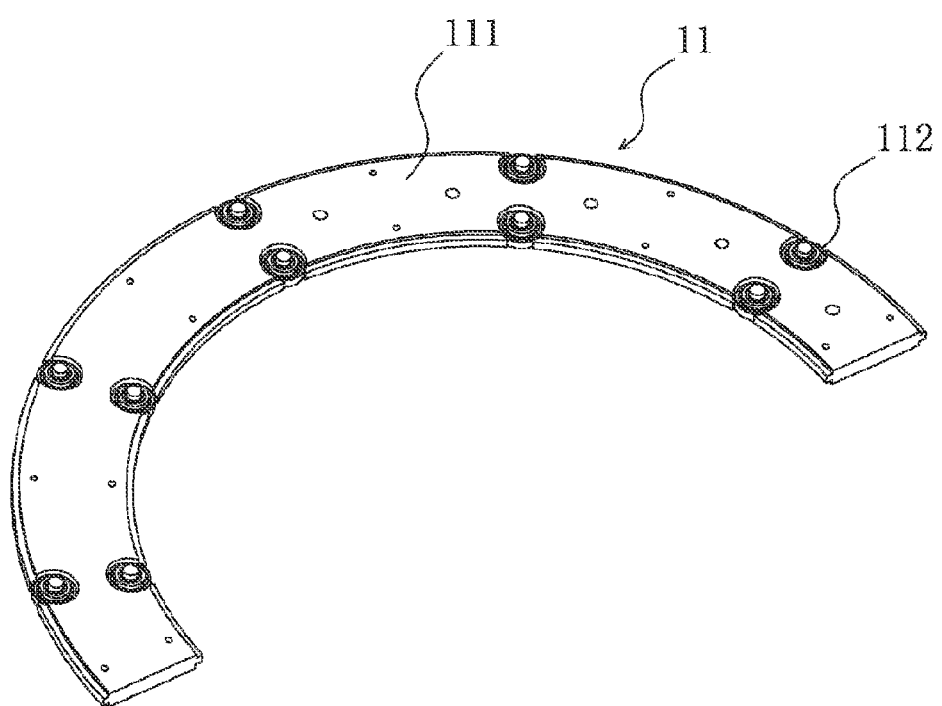
FIG. 5 is a view showing the first form of the annular guide rail of the disclosure.

Referring to FIGS. 4 and 5, according to a first form of the annular guide rail of the openable forcipate gear mechanism of the disclosure, the annular guide rail 11 includes an arc-shaped connecting flame 111 positioned on the circular base 1 and a plurality of bearings 112 mounted on the arc-shaped connecting frame 111 and distributed along a circumference. The annular gear 2 is formed thereon with an annular groove 21, which is provided at inner and outer rings thereof with slots 22. The bearings 112 are clipped into the slots 22. The arc-shaped connecting frame 111 of the annular guide rail 11 is provided thereon with a plurality of bearings 112 which are clipped into the slots 22 in the inner and outer rings of the grooves 21, so as to reduce the abrasion or damage caused by the friction resulted from the annular gear rotating on the arc-shaped connecting frame, thus extending the service life. Meanwhile, clipping the bearings into the slots can provide certain support and fixation to the annular gear, thus ensuring that the annular gear rotates steadily on the arc-shaped connecting frame.

Figure 6:
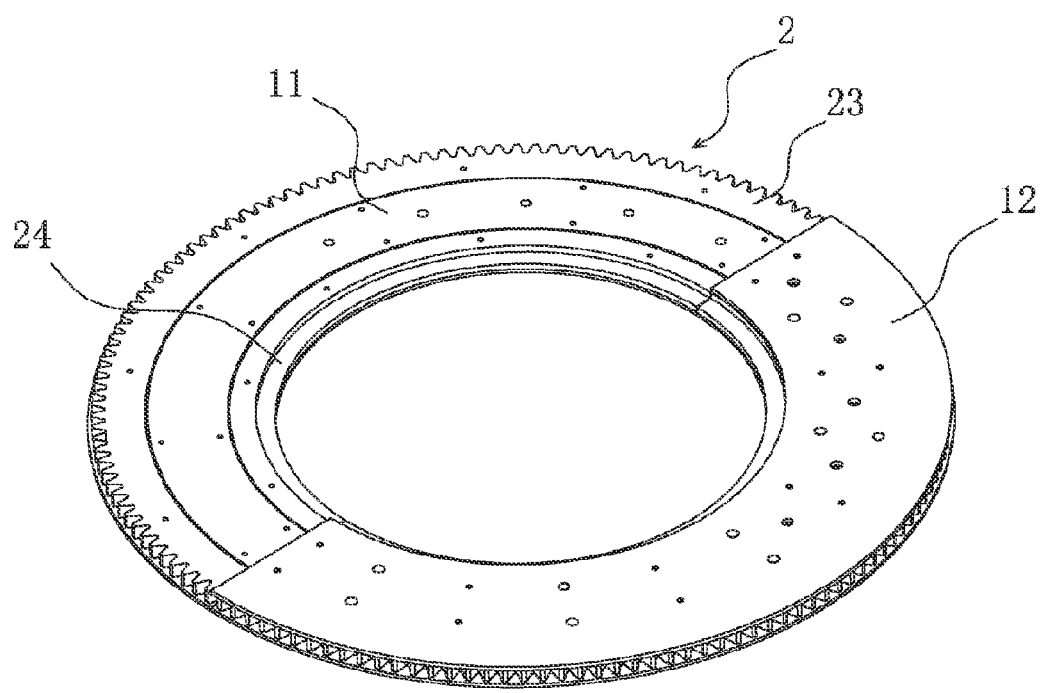
FIG. 6 is a view showing the openable forcipate gear mechanism having a second form of the annular guide rail.
Figure 7:
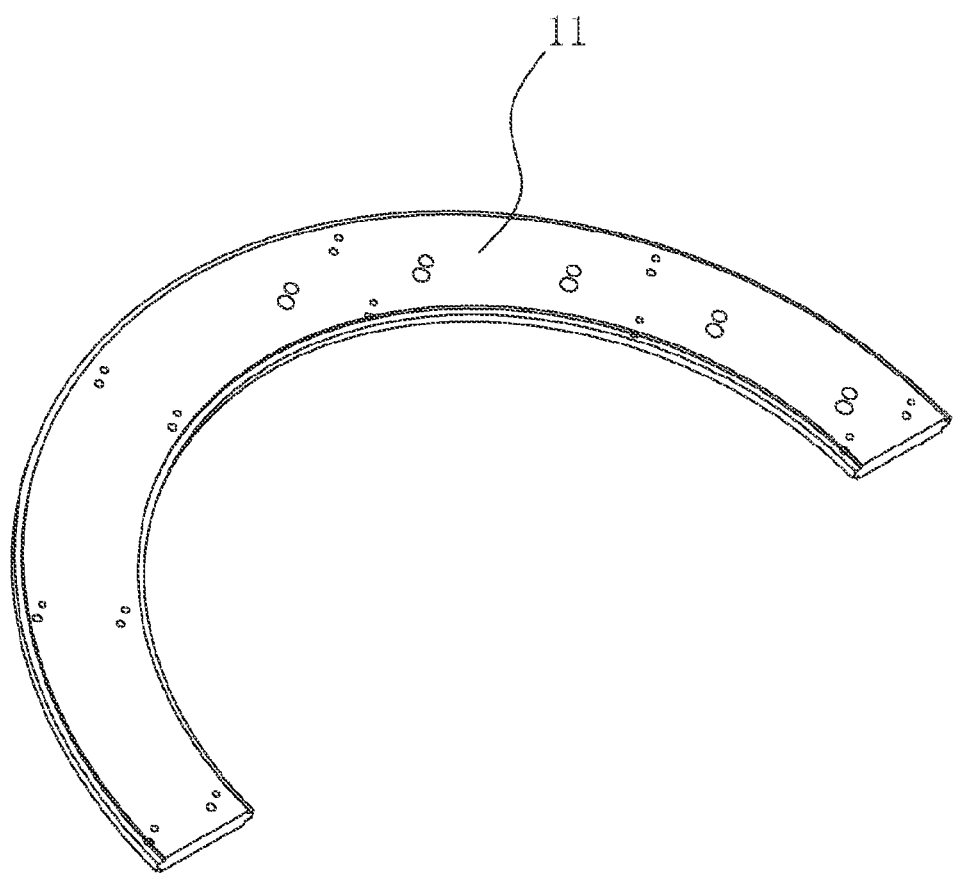
FIG. 7 is a view showing the second form of the annular guide rail.

Referring to FIGS. 6 and 7, according to a second form of the annular guide rail of the openable forcipate gear mechanism of the disclosure, the annular guide rail 11 is formed of two semicircular guide rails. The annular gear 2 is provided with an annular groove 21 which is connected with the annular guide rail 11. The annular de rail 11 of such structure is connected with the annular gear 2 in such a way that the annular gear 2 is provided with a groove 21 in which the annular guide rail 11 is installed, and enables the annular gear 2 to slide on the annular guide rail 11, thus simplifying the structure and reducing the costs.

Figure 8:
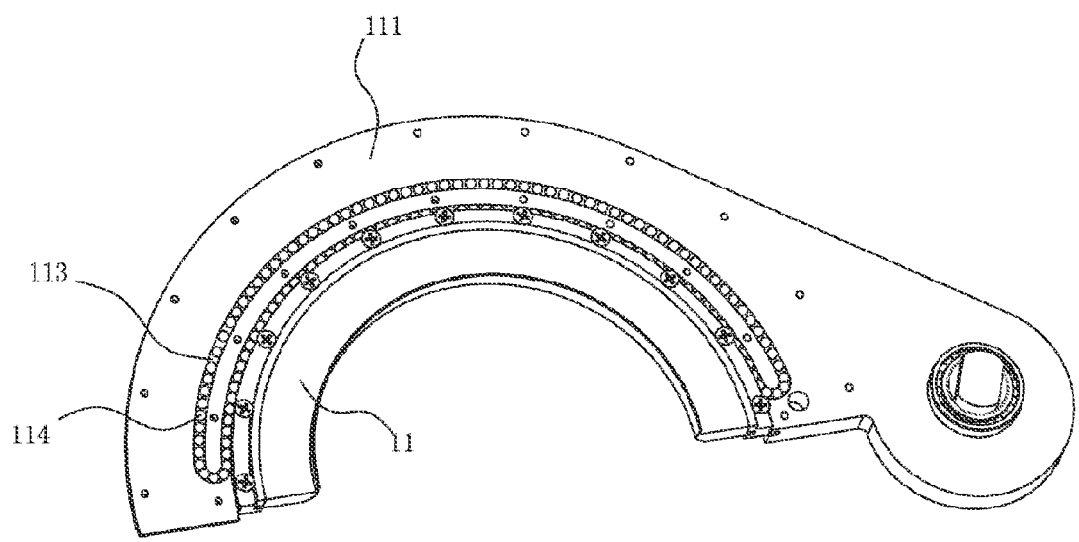
FIG. 8 is a view showing a third form of the annular guide rail.

Referring to FIG. 8, according to a third form of the annular guide rail of the openable forcipate gear mechanism of the disclosure, the annular guide rail 11 includes an arc-shaped support 111 which is provided with an annular ball backflow channel 112 and balls 114 provided in the annular ball backflow channel 113. The annular gear 2 is formed with an annular groove 21 which is provided at inner and outer rings thereof with slots 22. The balls 113 are positioned in the slots 22. Using the balls 113 to connect the arc-shaped connecting frame 111 and the annular gear 2 has substantially the same mechanical principle and technical effects as using the bearing for connection. Therefore, detailed description is unnecessary.

Figure 3:
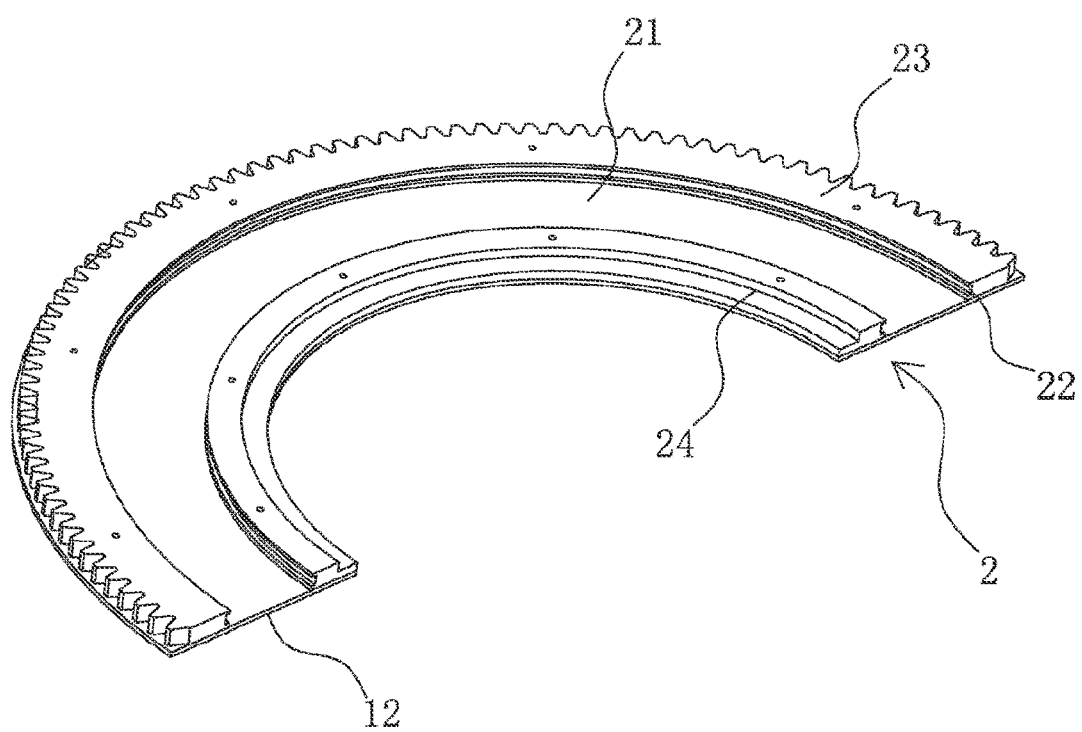
FIG. 3 is a view showing the openable forcipate gear mechanism of the disclosure.

Refer to FIG. 3, according to the opt, able forcipate gear mechanism of the present disclosure, the annular gear 2 is formed at an outer ring thereof with engaging teeth 23 and at an inner ring thereof with a connecting portion 24 suitable for connecting with external parts. The outer ring of the annular gear 2 is formed with engaging teeth 23 for the connection with external parts and the inner ring is formed with a connecting portion 24 for the connection with the external parts. The annular gear 2 may be an integral structure, or the engaging teeth 23 may be connected with the a connecting portion 24 by a fixing plate 12 so as to make the engaging teeth drive the a connecting portion to rotate ensuring more extensive application and precision. The a connecting portion 24 can be connected with parts which need to be driven. The annular gear 2 functions as the power transmission assembly.

As shown in FIGS. 9 to 17, an embodiment of a forcipate gear open-close mechanism includes the forcipate gear mechanism 1', an open-close device 3 for driving the forcipate gear mechanism 1' and a power transmission device 4. The forcipate gear mechanism 1' in this embodiment includes the forcipate gear mechanism in the above embodiment and the open-close device 3 matching each other. Namely, the forcipate gear mechanism 1' includes a circular base 1 spliced by two parts and an annular gear 2 spliced by two parts. The circular base 1 is provided with the annular guide rail 11 which is splieced by parts. The annular gear 2 is mounted on the annular guide rail 11 and rotates on the guide rail 11. The open-close device 3 drives the annular gear 2 and the circular base 1 spliced by two parts to open or close, so that the gear mechanism can is easily clamped on the iron core, thus facilitating the coil to be wound on the three-dimensional iron core.

Referring to FIG. 2, according to the forcipate gear open-close mechanism of the present disclosure, respective splicing joints of the circular base 1, the annular guide rail 11 and the annular gear 2 coincide with each other. Each of the circular base 1, the annular guide rail 11 and the annular gear 2 is spliced by two semicircular parts. Because the splicing joints of the circular base 1, the annular guide rail 11 and the annular gear 2 spliced by two parts coincide with each other, the forcipate gear mechanism according to the present disclosure can be easily opened.

Referring to FIGS. 4 to 8, according to the forcipate gear open-close mechanism of the present disclosure, the annular guide rail 11 is either a rolling guide rail or a slide guide rail, so that the friction between the annular gear and the guide rail can be effectively reduced, thus greatly reducing the abrasion between the components and extending the service life thereof.

The disclosure provides three forms of the design structure of the annular guide rail.

Referring to FIGS. 4 and 5, according to a first form of the annular guide rail of the forcipate gear open-close mechanism, the annular guide rail 11 includes an arc-shaped connecting frame 111 positioned on the circular base 1 and a plurality of bearings 112 mounted on the arc-shaped connecting frame 111 and distributed along a circumference. The annular gear 2 is formed thereon with annular grooves 21, which are provided at inner and outer rings thereof with slots 22. The bearings 112 are clipped into the slots 22. The arc-shaped connecting frame 111 of the annular guide rail 11 is provided thereon with a plurality of bearings 112 which are clipped into the slots 22 in the inner and outer rings of the grooves 21, so as to reduce the abrasion or damage caused by the friction resulted from the annular gear rotating on the arc-shaped connecting frame, thus extending the service life. Meanwhile, clipping the bearings into the slots can provide certain support and fixation to the annular gear, thus ensuring that the annular gear rotates steadily on the arc-shaped connecting frame.

Referring to FIGS. 6 and 7, according to a second form of the annular guide rail of the forcipate gear open-close mechanism, the annular guide rail 11 is formed of two semicircular guide rails. The annular gear 2 is provided with annular grooves 21 which are connected with the annular guide rail 11. The annular guide rail 11 of such structure is connected with the annular gear 2 in such a way that the annular gear 2 is provided with a groove 21 in the annular guide rail 11 is installed, and enable the e annular gear 2 to slide on the annular guide rail 11, thus simplifying the structure and reducing the costs.

Referring to FIG. 8, according to a third form of the annular guide rail of the forcipate gear open-close mechanism, the annular guide rail 11 includes an arc-shaped support 111 which is provided with an annular ball backflow channel 112 and balls 114 provided in the annular ball backflow channel 113. The annular gear 2 is formed with an annular groove 21 which is provided at inner and outer rings thereof with slots 22. The balls 113 are positioned in the slots 22.Using the balls 113 to connect the arc-shaped connecting frame 111 and the annular gear 2 has substantially the same mechanical principle and technical effects as using the bearing for connection. Therefore, detail description is unnecessary.

Referring to FIG. 3, according to the forcipate gear open-close mechanism of present disclosure, the annular gear 2 is formed at an outer ring thereof with engaging teeth 23 and at an inner ring thereof with a connecting portion 24 suitable for connecting with external parts. The outer ring of the annular gear 2 is formed with engaging teeth 23 for the connection with external parts and the inner ring is formed with a connecting portion 24 for the connection with the external parts. The annular gear 2 may be an integral structure, or the engaging teeth 23 may be connected with the connecting portion 24 by a fixing plate 12 so as to make the engaging teeth drive the connecting portion to rotate, ensuring more extensive application and precision.

Referring to FIGS. 1, 2, 9, and 10, according to the forcipate gear open-close mechanism of the present disclosure, the opening and closing device 3 includes two connecting arms 31 connected with the base 1 of two parts, a fixing plate 32 with which the connecting arms 31 articulate, and a pushrod 33 connected with the connecting arms 31. The forcipate gear mechanism 1' is installed on the connecting arms 31. The connecting arms 31 are driven by the pushrod 33. The pushrod 33 is in slip connection with the fixing plate 32 at a central part thereof The connecting arms 31 are provided with the arc-shaped slots 311. Ends of the pushrod 33 are connected with the arc-shaped slots 311 and slide along the arc-shaped slots 311. The ends of the pushrod 33 are provided with bearings 331 which are positioned within the arc-shaped slots 311. The fixing plate 32 is provided thereon with a drive motor 321 and a screw 322 driven by the drive motor 321. The central part of the pushrod 33 is provided with a drive nut 332 connected with the screw 322. This structure can facilitate the coil to be wound on the iron core of the transformer and strengthen the structure of the forcipate gear open-close mechanism, ensuring that the components do not influence each other when the forcipate gear open-close mechanism clamps and unclamps the three-dimensional iron core.

When the base 1 and annular gear 2 are to be opened, an external control device controls the drive motor 321 to rotate. The two connecting arms 31 are opened to the left and right by the actuation of the pushrod 33 which is driven by the drive motor 321 through the screw 322 and drive nut 332 engaging with each other. A bearings 331 is positioned on each end of the pushrod 33. The connecting arms 31 are provided with the arc-shaped slots 311. The connecting arms 31 are driven to move by the pushrod 33 through the bearings 331 sliding within the arc-shaped slots 311. The connecting arms 31 are connected with the clamping parts composed of the circular base 1 and the annular gear 2 by a fixing plate 32. The connecting arms 31 open to the right and left, simultaneously causing the clamping parts to open to the right and left. Vice versa, the drive motor 321 is controlled reversely to achieve the closing of the clamping parts composed of the circular base 1 and the annular gear 2.

Figure 9:
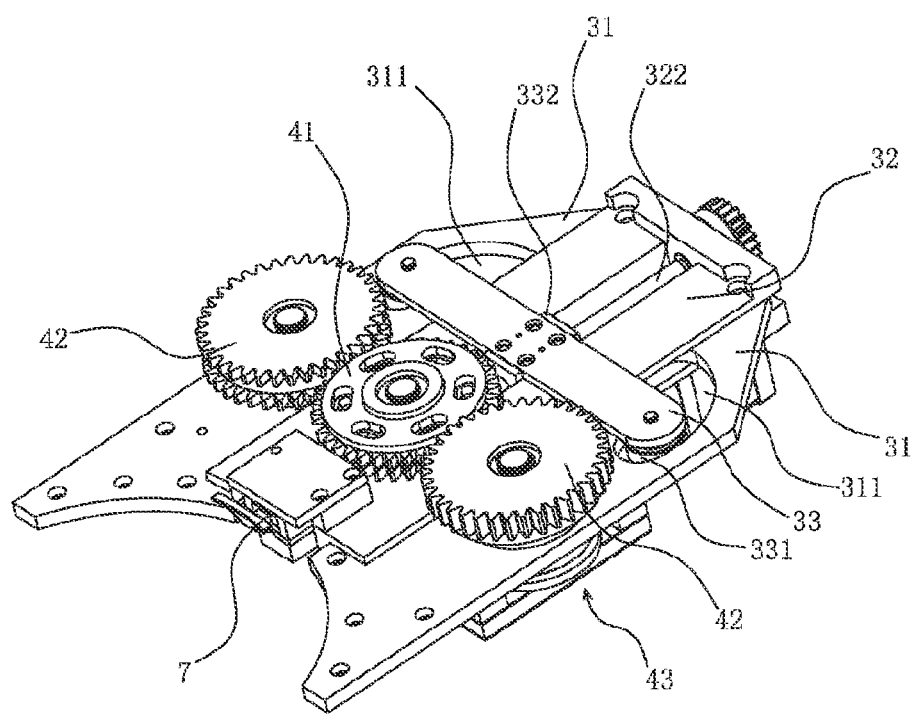
FIG. 9 is a view showing an opening and closing device of a forcipate gear open-close mechanism of the disclosure.
Figure 10:
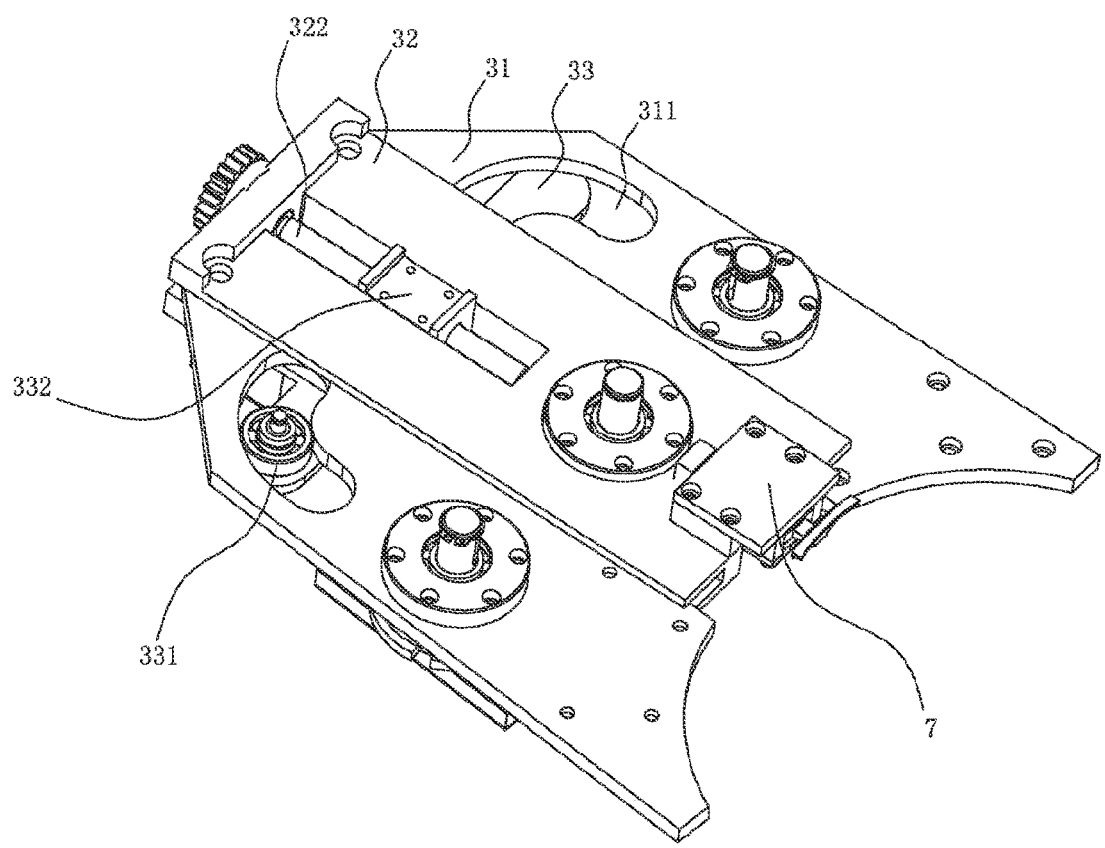
FIG. 10 is a view showing a part of the opening and closing device of the forcipate gear open-close mechanism of the disclosure.
Figure 11:
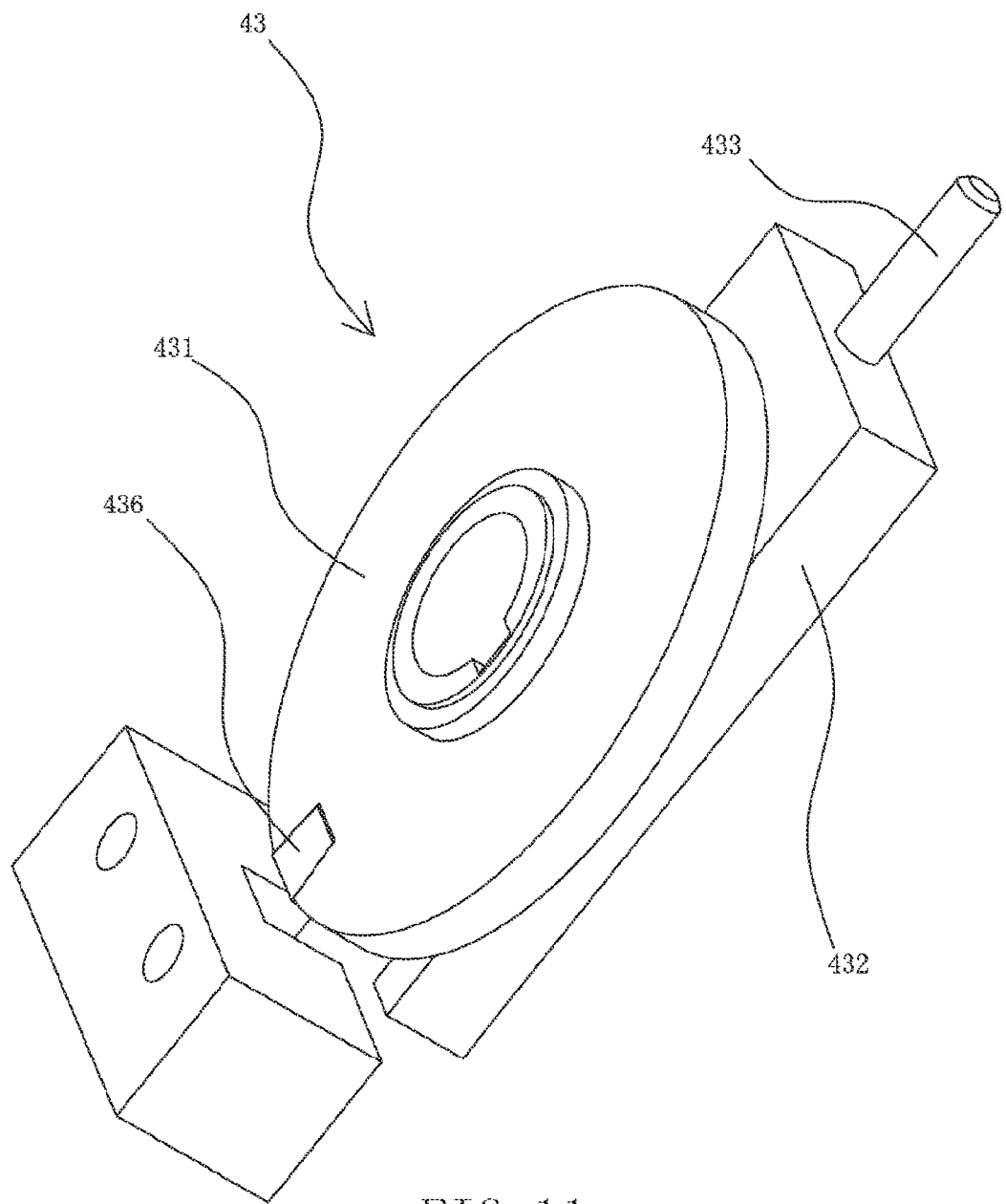
FIG. 11 is a view showing a structure for detecting and locking open and close locations of the forcipate gear open-close mechanism in the locked state.
Figure 12:
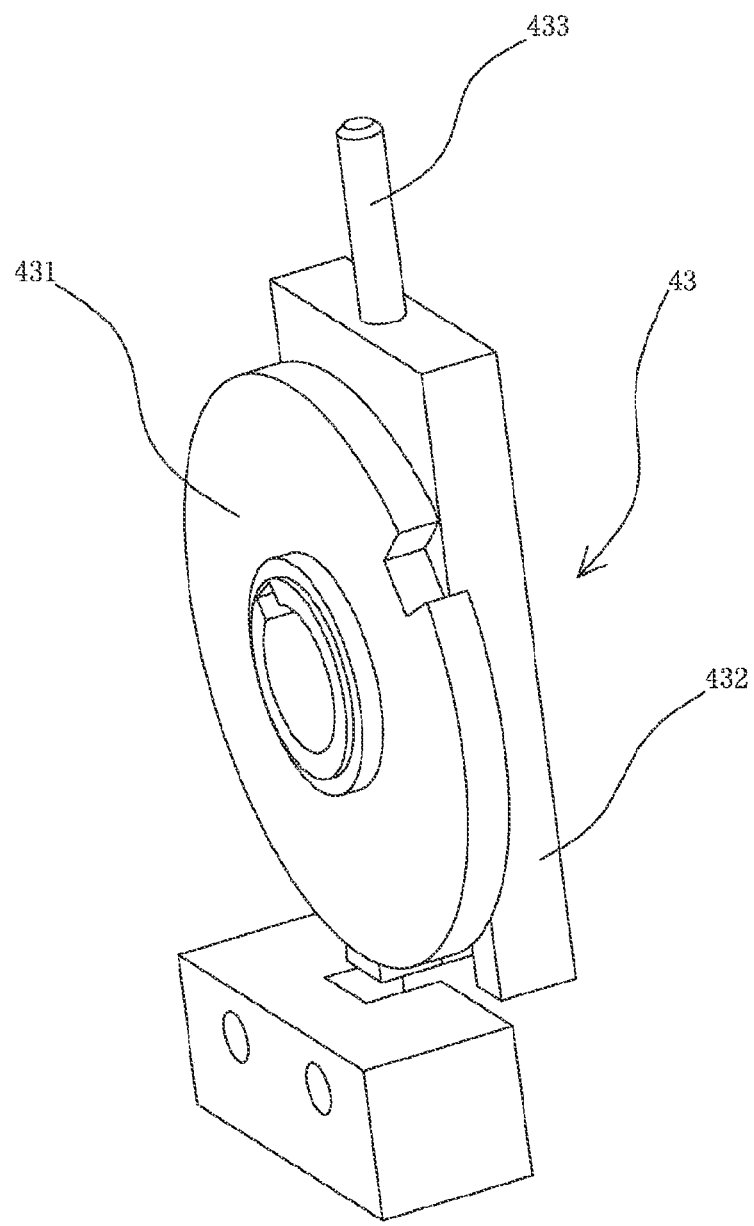
FIG. 12 is a view showing the structure for detecting and locking open and close locations of the forcipate gear open-close mechanism in the unlocked state.
Figure 13:
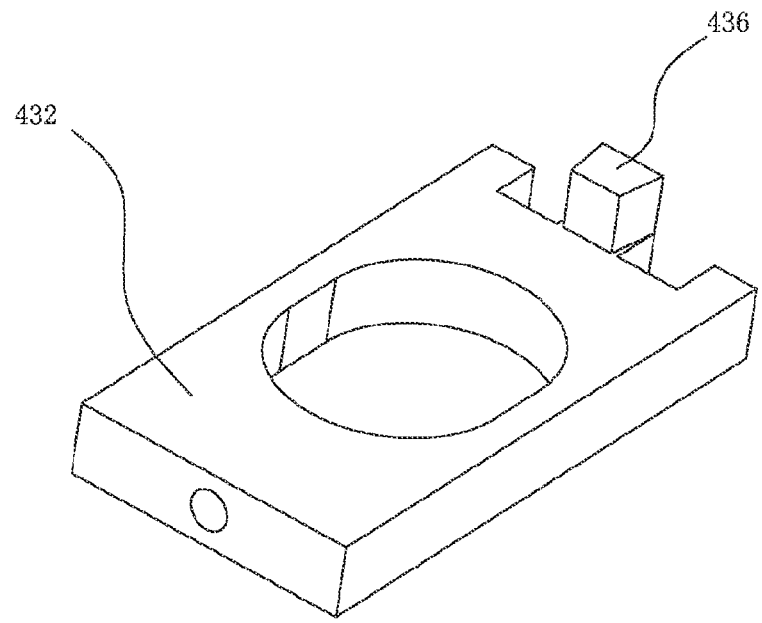
FIG. 13 is a view showing a locking member of the forcipate gear open-close mechanism of the disclosure.
Figure 14:
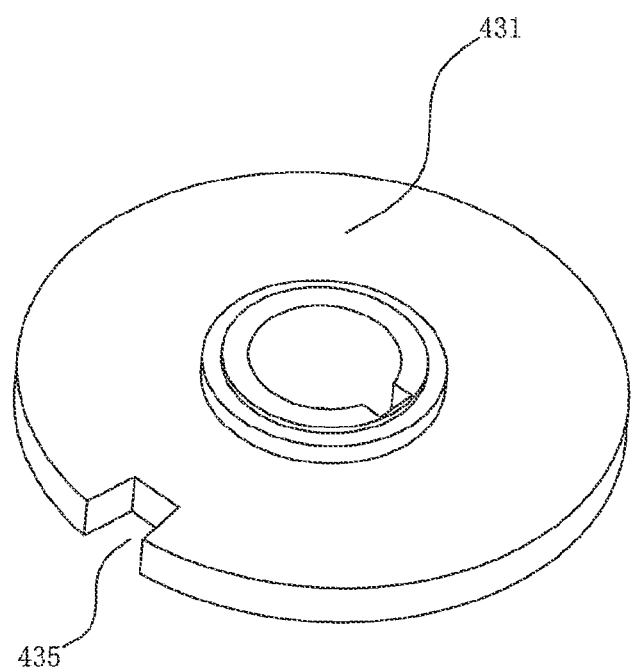
FIG. 14 is a view showing a locking wheel of the forcipate gear open-close mechanism of the disclosure.
Figure 15:
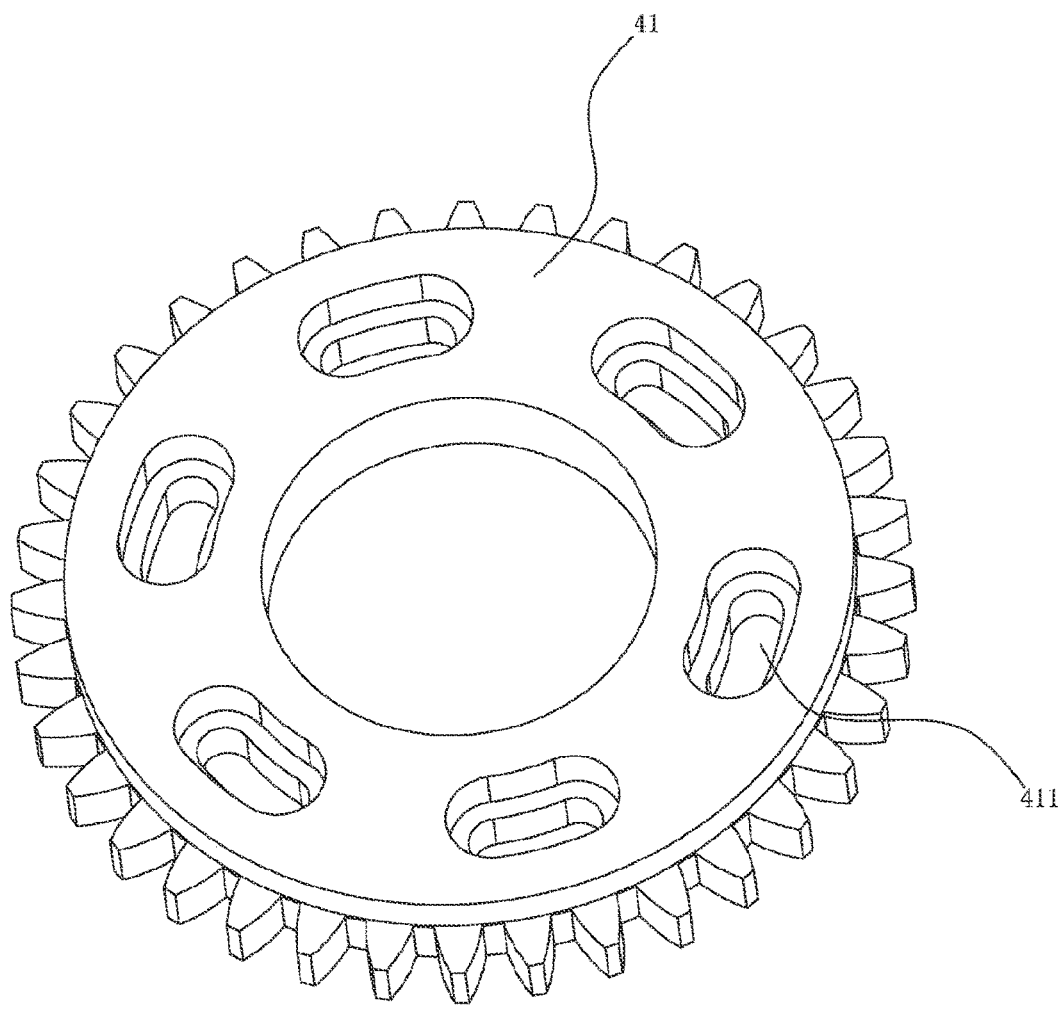
FIG. 15 is a view showing one of plate gears of the driving gear of the forcipate gear open-close mechanism of the disclosure.

Referring to FIG. 9, according to the forcipate gear open-close mechanism of the present disclosure, the power transmission device 4 includes a driving gear 41 mounted on the fixing plate 31 and two driven gears 42 mounted on the connecting arms 31. The two driven gears 42 are engaged with the annular gear 2 respectively. When the forcipate gear open-close mechanism clamps the iron core for coil winding, under the action of the external force, the driving gear 41 positioned on the fixing plate 32 causes the two driven gears 42 engaged with the driving gear 41 to rotate, and meanwhile the driven gears 42 are engaged with the annular gear 2 spliced by two parts, thus actuating the annular gear 2 to rotate and actuating the coil reel to rotate to wind the coil of the iron core. The driving gear 41 is formed of two plate gears, one of which is equipped with a rotation adjusting and locking structure 411. The two plate gears are respectively engaged with the two driven gears 42. In order to ensure good engagement of the driving gear 41 with the driven gears 42 and thus achieve better transmission effect, the driving gear 41 is designed to be equipped with two plate gears, one of which is equipped with the rotation adjusting and locking structure 411, namely, arc-shaped holes, thereby having certain adjustment space. When the driving gear 41 is appropriately engaged with the driven gears 42, the mechanism is locked via bolts.

Referring to FIGS. 11 to 14, the forcipate gear open-close mechanism of the present disclosure also includes three structures 43 for detecting and locking open and close locations, which are connected with the driving gear 41 and the two driven gears 42 respectively. Each of those structures 43 includes a locking wheel 431, a locking member 432 for locking the locking wheel 431, and a mandrel 433 for controlling movement of the locking member 432. The mandrel 433 is matched with the pushrod 33 and connected with a sensor 7, which detects the positional relationship among the splicing joints of the circular base 1, annular guide rail 11 and annular gear 2. The locking wheel 431 is provided with a notch 435 and the locking member 432 is provided with a hook 436. When the splicing joints of the circular base 1 annular guide rail 11 and annular gear 2 coincide with each other, the clamping mechanism spliced by two pieced need to be opened to make the pushrod 33 slide in the arc-shaped slots 311 in the connecting arm 31. The arc-shaped slots 311 are configured to permit the pushrod 33 to slide axially by a distance, so that the pushrod 33 controls each of the structures 43 for detecting and locking the open and close locations to lock the driving gear 41 and the driven gears 42 respectively, without causing movement of the connecting arms 31. While sliding axially by the distance, the pushrod 33 pushes the mandrel 433 of the structures 43 for detecting and locking the open and close locations against the locking member 432. The locking member 432 is equipped with the hook 436 and the locking wheel 431 is equipped with the notch 435. The hook 436 is clipped into the notch 435 so as to make the locking wheel 431 lock the driving gear 41 and the driven gears 42.

Figure 16:
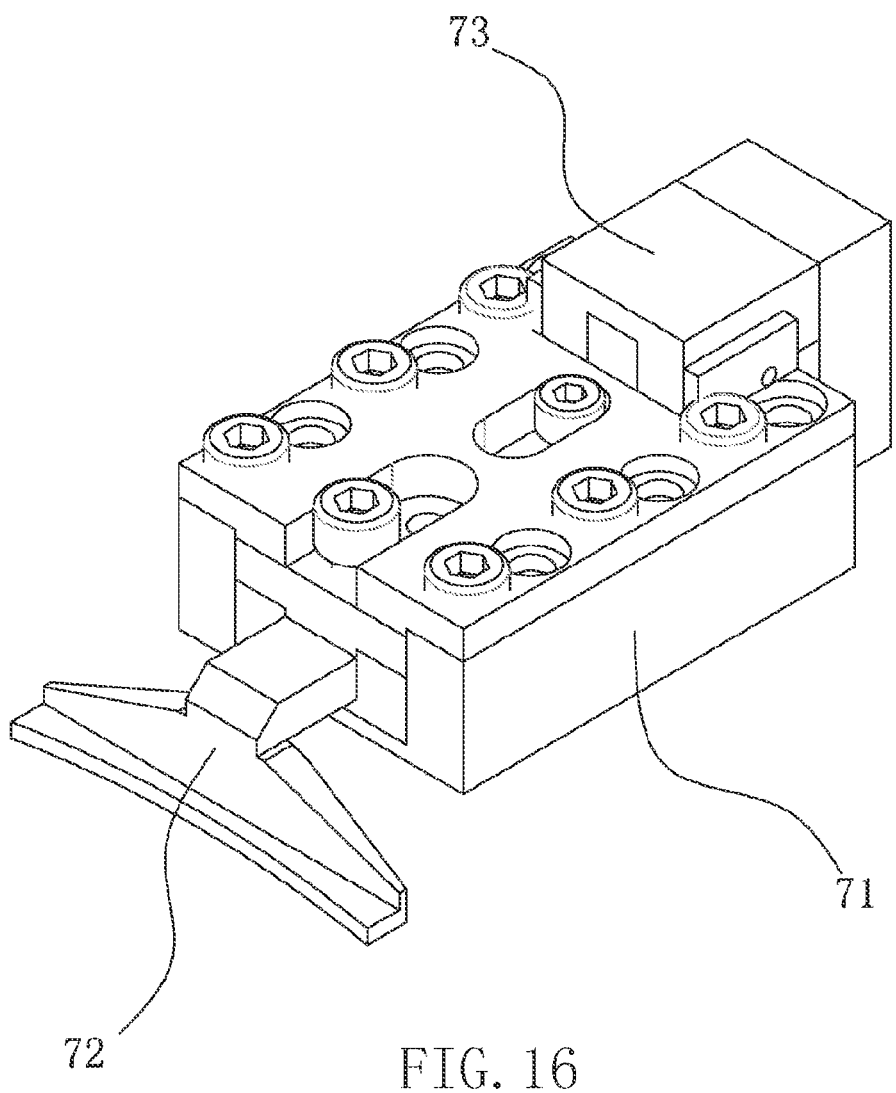
FIG. 16 is a perspective view show a sensor of the forcipate gear open-close mechanism of the disclosure.
Figure 17:
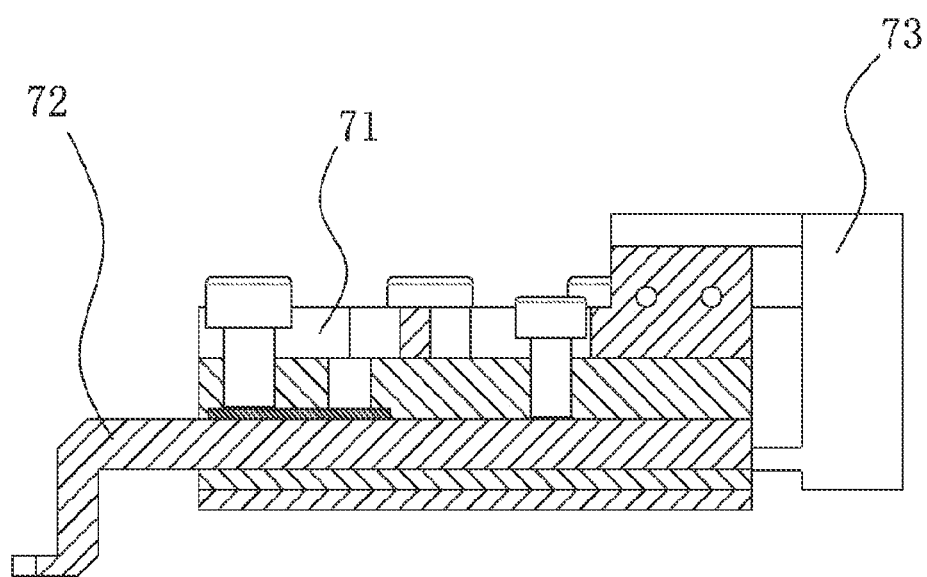
FIG. 17 is a sectional view showing the sensor of the forcipate gear open-close mechanism of the disclosure.

Referring to FIGS. 16 and 17, according to the forcipate gear open-close mechanism of the present disclosure, the sensor 7 includes a shell 71 fixed on the base 1, a trigger 72 positioned on the shell 71, and two sensitive snitches 73 triggered by the trigger 72. During the movement of the sensor 7 with the gear mechanism, the trigger 72 pushes the sensitive switches 73 to output information to the control device, which may be either a control circuit or a control panel. The control circuit is a traditional circuit and thus is not shown in the drawings. At least three sensors 7 are provided, one of which is positioned at the splicing joint of the circular has 1 for detecting positional relationship among the splicing joints of the circular base 1, annular guide rail 11 and annular gear 2. When the splicing joints of the circular base 1, annular guide rail 11, and annular gear 2 coincide with each other, the clamping mechanism spliced by two parts opens. The other two sensors 7 are distributed on the base 1 along the circumference for detecting positional relationship between the forcipate gear mechanism and the three-dimensional iron core, and for outputting the detecting signal to the control device. The control device actuates an adjusting structure 5 to adjust the position of the forcipate gear mechanism and the three-dimensional iron core in order to grip the iron core.

As shown in FIGS. 18 to 25, an embodiment of a winding machine of the present disclosure includes a body 9 and an forcipate gear open-close mechanism 2' positioned on the body 9. The forcipate gear open--close mechanism 2' includes a forcipate gear mechanism 1', an opening and closing device 3 for driving the forcipate gear mechanism 1', and a power transmission device 4. The forcipate gear mechanism 1' includes the circular base 1 spliced by two parts and the annular gear 2 spliced by two parts. The circular base 1 is equipped with an annular guide rail 11 which is spliced. The annular gear 2 is installed on the guide rail 11 and rotates on the guide rail 11. Because the opening and closing device 3 drive the annular gear 2 and the circular base 1 spliced by two parts to open or close, the gear mechanism can easily grip the iron core, thus facilitating the coil to be wound around the three-dimensional iron core.

Referring to FIG. 2, according to the winding machine of the present disclosure, the splicing joints of the circular base 1, the annular guide rail 11 and the annular gear 2 coincide with each other. The circular base 1, the annular guide rail 11 and the annular gear 2 are all spliced by two semicircular parts. Because the splicing joints of the circular base 1, the annular guide rail 11 and the annular gear 2 all spliced by two parts coincide with each other, the forcipate gear mechanism of the present disclosure can be easily opened when the coil is not required to be wound.

Referring to FIGS. 4 to 8, according to an embodiment of the winding machine of the present disclosure, the annular guide rail 11 is either a rolling guide rail or a slide guide rail, which can effectively reduce the friction between the annular gear and the guide rail, thus greatly reducing the abrasion between the components and extending the service life thereof.

The disclosure provides three forms of the design structure of the annular guide rail:

Referring to FIGS. 4 and 5, according to a first form of the annular guide rail of the winding machine of the disclosure, the annular guide rail 11 includes an arc-shaped connecting frame 111 positioned on the circular base 1 and a plurality of bearings 112 mounted on the arc-shaped connecting frame 111 and distributed along a circumference. The annular gear 2 is formed thereon with an annular groove 21, which is provided at inner and outer rings thereof with slots 22. The bearings 112 are clipped into the slots 22. The arc-shaped connecting frame 111 of the annular guide rail 11 is provided thereon with a plurality of bearings 112 which are clipped into the slots 22 in the inner and outer rings of the groove 21, so as to reduce the abrasion or damage caused by the friction resulted from the annular gear rotating on the arc-shaped connecting frame, thus extending the service life. Meanwhile, clipping the bearings into the slots can provide certain support and fixation to the annular gear, thus ensuring that the annular gear rotates steadily on the arc-shaped connecting frame.

Referring to FIGS. 6 and 7, according to a second form of the annular guide rail of the winding machine of the disclosure, the annular guide rail 11 is formed of two semicircular guide rails. The annular gear 2 is provided with an annular groove 21 which is connected with the annular guide rail 11. The annular guide rail 11 of such structure is connected with the annular gear 2 in such a way that the annular gear 2 is provided with a groove 21 in which the annular guide rail 11 is installed, and enables the annular gear 2 to slide on the annular guide rail 11, thus simplifying the structure and reducing the costs.

Referring to FIG. 8, according to a third form of the annular guide rail of the winding machine of the disclosure, the annular guide rail 11 includes an arc-shaped support 111 which is provided with an annular ball backflow channel 112 and balls 114 provided in the annular ball backflow channel 113. The annular gear 2 is formed with an annular groove 21 which is provided at inner and outer rings thereof with slots 22. The balls 113 are positioned in the slots 22. Using the balls 113 to connect the arc-shaped connecting frame 111 and the annular gear 2 has substantially the same mechanical principle and technical effects as using the bearing for connection. Therefore, detailed description is unnecessary.

Refer to FIG. 3, according to the winding machine of the present disclosure, the annular gear 2 is formed at an outer ring thereof with engaging teeth 23 and at an inner ring thereof with a connecting portion 24 suitable for connecting with external parts. The outer ring of the annular gear 2 is formed with engaging teeth 23 for the connection with external parts and the inner ring is formed with a connecting portion 24 for the connection with the external parts. The annular gear 2 may be an integral structure, or the engaging teeth 23 may be connected with the connecting portion 24 by a fixing plate 12 so as to make the engaging teeth drive the connecting portion to rotate, ensuring more extensive application and precision.

Referring to FIGS. 1, 2, 9 and 10, according to the winding machine of the present disclosure, the opening and closing device 3 includes two connecting arms 31 connected with the bases 1 of two parts, the fixing plate 32 with which the connecting arms 31 articulate, and the pushrod 33 connected with the connecting arms 31. The forcipate gear mechanism 1' is installed on the connecting arms 31. The connecting arms 31 are driven by the pushrod 33. The pushrod 33 is in slip connection with the fixing plate 32 at the central part thereof. The connecting arms 31 are provided with the arc-shaped slots 311. The ends of the pushrod 33 are connected with the arc-shaped slots 311 and slides along the arc-shaped slots 311. The ends of the pushrod 33 are provided with the bearings 331 which are positioned within the arc-shaped slots 311. The fixing plate 32 is provided thereon with the drive motor 321 and the screw 322 driven by the drive motor 321. The central part of the pushrod 33 is provided with the drive nut 332 connected with the screw 322. This structure can facilitate the coil to be wound around the iron core of the transformer and strenghten the structure of the forcipate gear open-close mechanism.

Referring to FIG. 9, according to the winding machine of the disclosure, the power transmission device 4 includes the driving gear 41 mounted on the fixing plate 31 and two driven gears 42 positioned on the connecting arms 31. The two driven gears 42 are engaged with the annular gear 2 respectively. When the open-close forcipate gear mechanism clamps the iron core for coil winding, under the action of the external force, the driving gear 41 positioned on the fixing plate 32 causes two driven gears 42 engaged with the driving gear 41 to rotate, and meanwhile the driven gears 42 are engaged with the annular gear 2 spliced by two parts, thus actuating the annular gear 2 to rotate and actuating the coil reel to rotate to wind the coil of the iron core. The driving gear 41 is formed of two plate gears, one of which is equipped with the rotation adjusting and locking structure 411. The two plate gears are respectively engaged with the two driven en gears 42. In order to ensure good engagement of the driving gear 41 with the driven gears 42 and achieve better transmission effect, the driving gear 41 is designed to be formed of two plate gears, one of which is equipped with the rotation adjusting and locking structure 411, namely, arc-shape holes, thereby having certain adjustment space. When the driving gear 41 is appropriately engaged with the driven gears 42, the mechanism is locked via bolts.

Referring to FIGS. 11 to 14, the winding machine of the present disclosure also includes three structures 43 for detecting and locking open and close locations, which are connected with the driving gear 41 and the two driven gears 42 respectively. Each of those structures 43 includes a locking wheel 431, a locking member 432 for locking the locking wheel 431, and a mandrel 433 for controlling movement of the locking member 432. The mandrel 433 is matched with the pushrod 33 and connected with a sensor 7, which detects the positional relationship among the splicing joints of the circular base 1, annular guide rail 11 and annular gear 2. The locking wheel 431 is provided with a notch 435 and the locking member 432 is provided with a hook 436. When the splicing joints of circular base 1, annular guide rail 11 and annular gear 2 coincide with each other, the clamping mechanism spliced by two pieced needs to be opened to make the pushrod 33 slide in the arc-shaped slots 311 on the arm 31. The arc-shaped slots 311 are configured to permit the pushrod 33 to slide axially by a distance, so that the pushrod 33 controls each of the structures 43 for detecting and locking the open and close locations to lock the driving gear 41 and driven gears 42 respectively, without causing movement of the connecting arms 31. While sliding axially by the distance, the pushrod 33 pushes the mandrel 433 of the structures 43 for detecting and locking the open and close positions against the locking member 432. The locking member 432, is equipped with a hook 436 and the locking wheel 431 is equipped with a notch 435. The hook 436 is clipped into the notch 135 so as to cause the locking wheel 431 o lock the driving gear 41 and the driven gears 42.

Referring to FIGS. 16 and 17, according to the winding machine of the disclosure, the sensor 7 includes a shell 71 fixed on the base 1, a trigger 72 positioned on the shell 71, and two sensitive switches 73 triggered by the trigger 72. During the movement of the sensor 7 with the gear mechanism, the trigger 72 pushes the sensitive switches 73. At least three sensors 7 are provided, one of which is positioned at the splicing joint of the circular base 1 for detecting positional relationship among the splicing joints of the circular base 1, annular guide rail 11, and annular gear 2. When the splicing joints of circular base 1, annular guide rail 11 and annular gear 2 coincide with each other, the clamping mechanism spliced by two pieced opens. The other two sensors 7 are distributed on the base 1 along the circumference for detecting the positional relationship between the forcipate gear mechanism and the three-dimensional iron core, and meanwhile for outputting the detecting signal to the control device. The control device actuates an adjusting structure 5 to adjust the position of the forcipate gear mechanism and the three-dimensional iron core in order to grip the iron core, Referring to FIG. 19 to FIG. 22, the winding machine according to the present disclosure also includes a locating device which includes an adjusting structure 5 with longitudinal and horizontal movements and a control device controlling the adjustment structure 5. The control device may he either a control circuit or a control panel. The control circuit is a traditional circuit and thus is not shown in the drawing. The adjusting structure 5 includes a transversal guide rail 51 connected with the body 9, a transversal connecting plate 52 mounted on the transversal guide rail 51, a longitudinal guide rail 53 positioned on the transversal connecting plate 52, a longitudinal connecting plate 54 mounted on the longitudinal guide rail 53, and a motor 55 actuating the transversal connecting plate 51 and the longitudinal connecting plate 54. The forcipate gear mechanism is mounted on the longitudinal connecting plate 54. After detecting the location of the iron core, the sensor 7 outputs the signal to the control device which respectively controls the transversal and longitudinal movement driven by the motor 55 according to the output signal to adjust the specific location of the forcipate gear mechanism, in order to grip the iron core, and ensure the forcipate gear mechanism coaxial the iron core for the purpose of coil winding.

Figure 23:
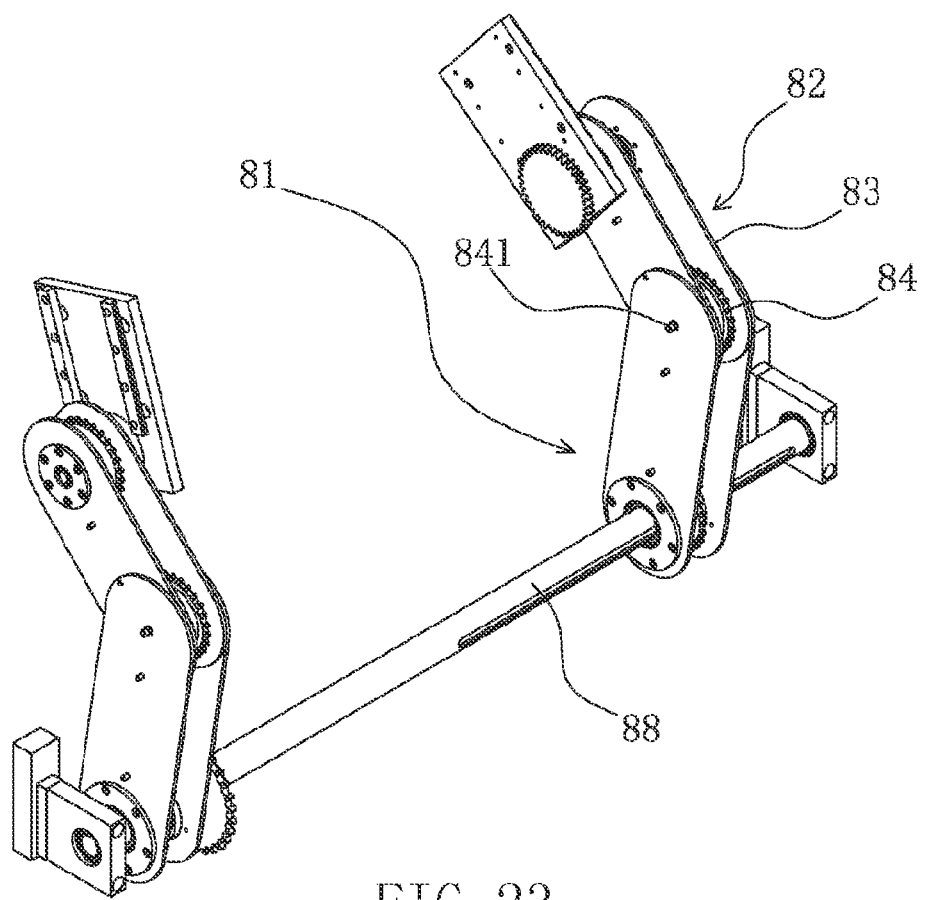
FIG. 23 is a perspective view showing a flexible power transmission mechanism of the winding machine of the disclosure.
Figure 24:
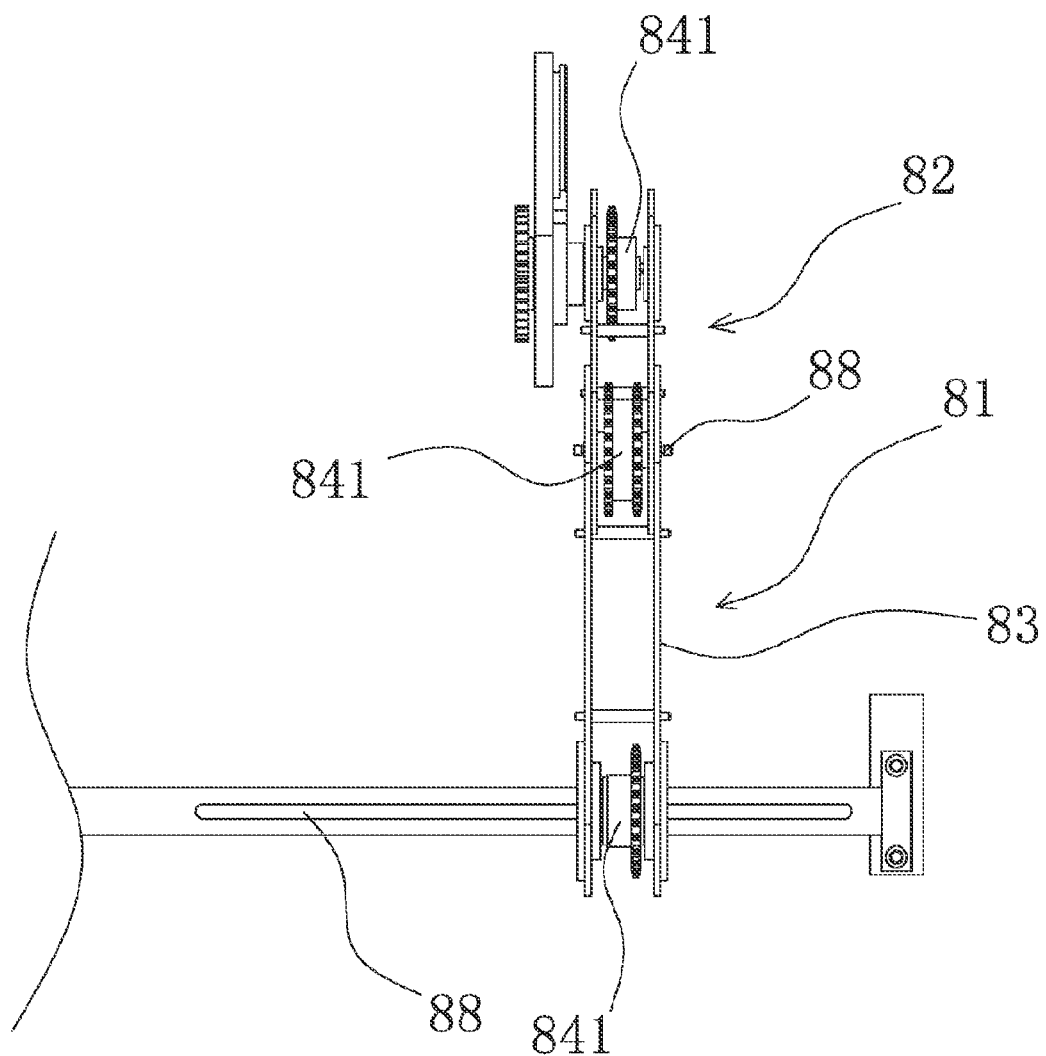
FIG. 24 is a front view showing the flexible power transmission mechanism of the winding machine of the disclosure.
Figure 25:
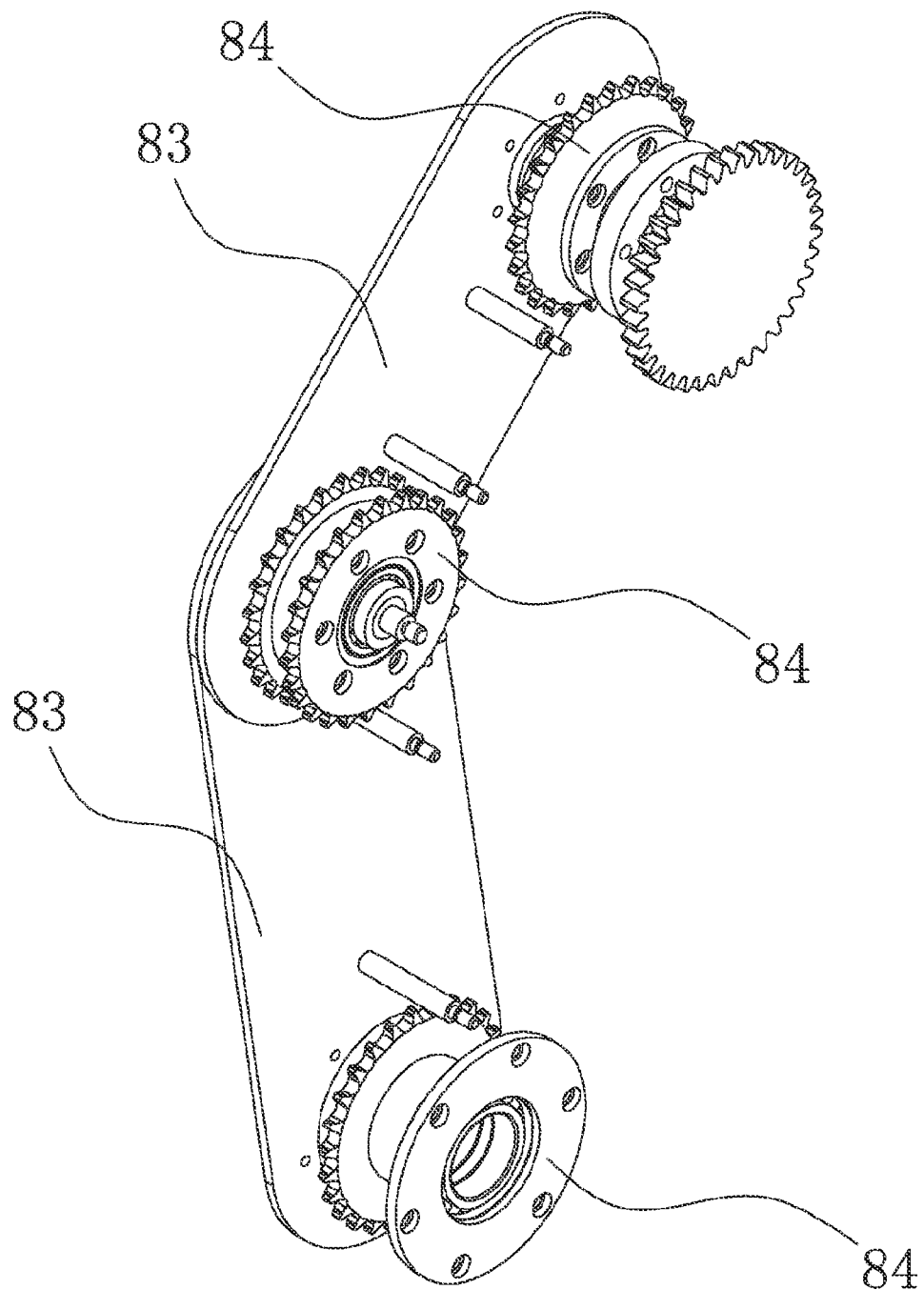
FIG. 25 is a view showing the flexible power transmission mechanism of the winding machine of the disclosure, with a connecting plate at one side removed.

Referring to FIG. 23 to FIG. 25, the winding machine further includes a flexible power transmission mechanism 8 which includes a first transmission arm 81 connected with a power output, haft 88 and a second transmission arm 82 connected with the forcipate gear mechanism 1'. One end of the first transmission arm 81 is articulated with one end of the second transmission arm 82. Each of the first and second transmission arms 81 and 82 includes a connecting plate 83, chain wheel sets 84 positioned on two ends of the connecting plate 83, and a chain (not shown in the Figures) for connecting with the chain wheel sets 84. The flexible power transmission mechanism for the iron core coil winding machine according to the disclosure has the following advantages: simple structure, low production cost, and better adaptability where the power transmission equipment is varied in the location.

As shown in FIGS. 23 to 25, according to an embodiment of the winding machine of disclosure, the chain wheel sets 84 are mounted on the connecting plate 83 via a spindle 841. The articulating point of the first transmission arm 81 with the second transmission arm 82 is located at the chain wheel sets 84 connected with each other. Each of the first transmission 81 and the second transmission arm 82 includes a connecting plate 83, belt wheel sets positioned on the two ends of the connecting plate 83, and a belt or synchronous belt connecting the belt wheel sets. The belt wheel sets and the belt or synchronous belt connecting the belt wheel sets are only used in replace of the chain wheel sets and the chain connecting h the chain wheel sets. The former has the same operating principle as the latter. Therefore, the belt Wheel set and the belt are not shown in the drawings. The driving of this disclosure relies on the belt or synchronous belt, having the advantage of stable transmission, low noise, low vibration and overload protection feature.

As shown in FIGS. 23 and 24, according to an embodiment of the winding machine of this disclosure, a plurality of flexible power transmission mechanisms compose a multi-row structure, which is featured by stable transmission and simple structure.

Figure 18:
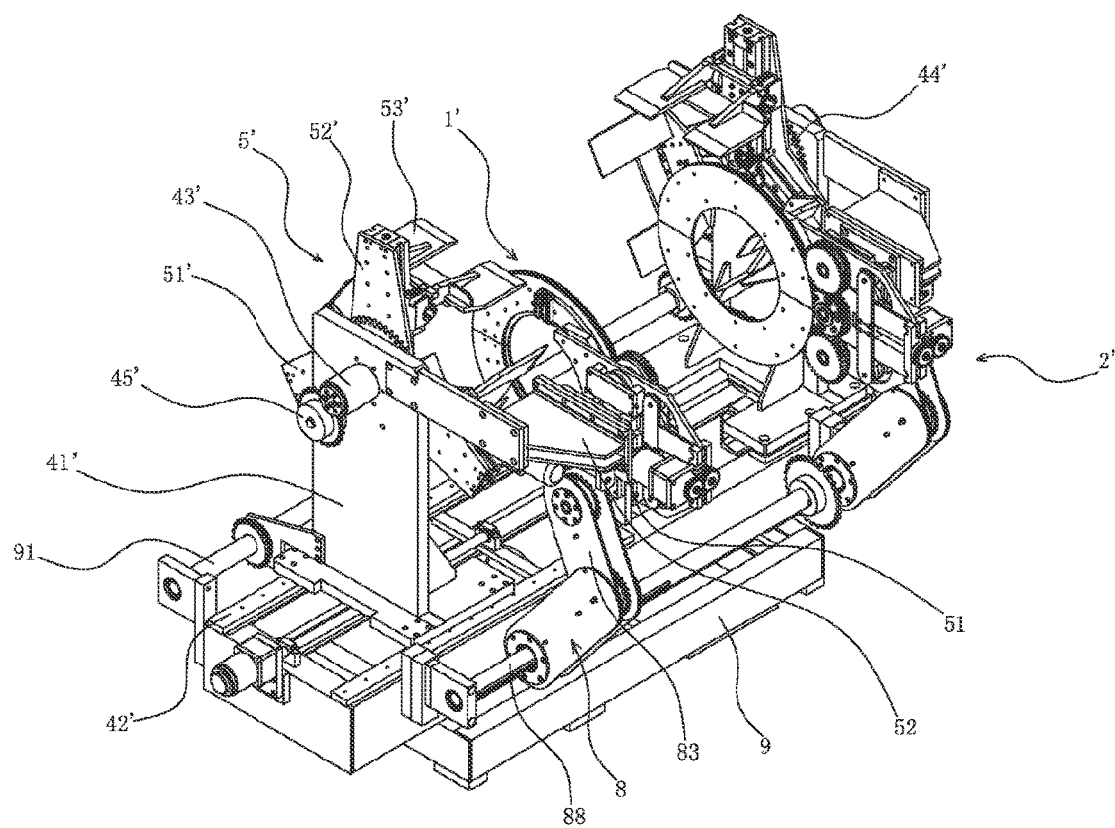
FIG. 18 is a view showing s winding machine of the disclosure.
Figure 19:
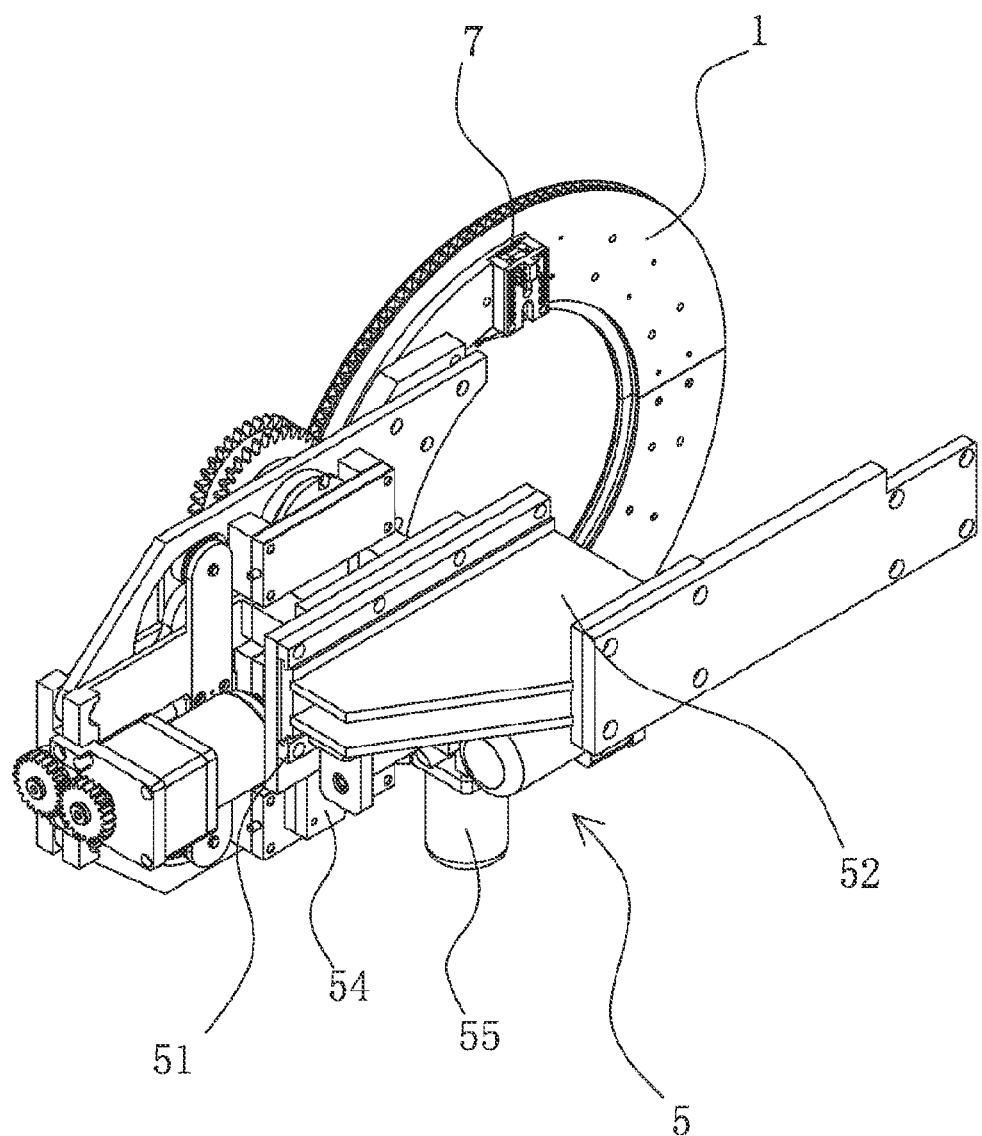
FIG. 19 is a perspective view showing a locating device of the winding machine of the disclosure.
Figure 20:
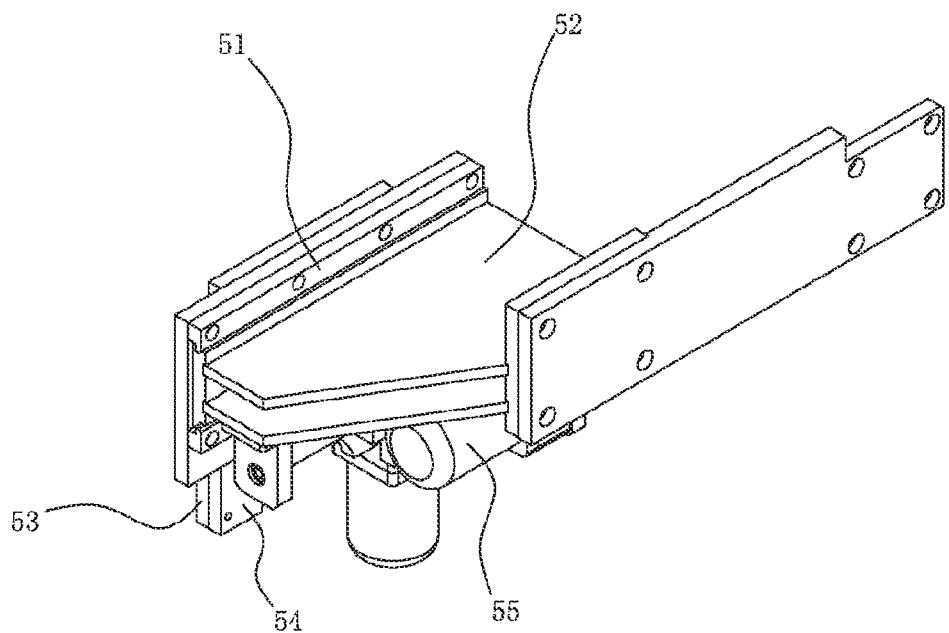
FIG. 20 is a first view showing a transversal guide rail of the winding machine of the disclosure.
Figure 21:
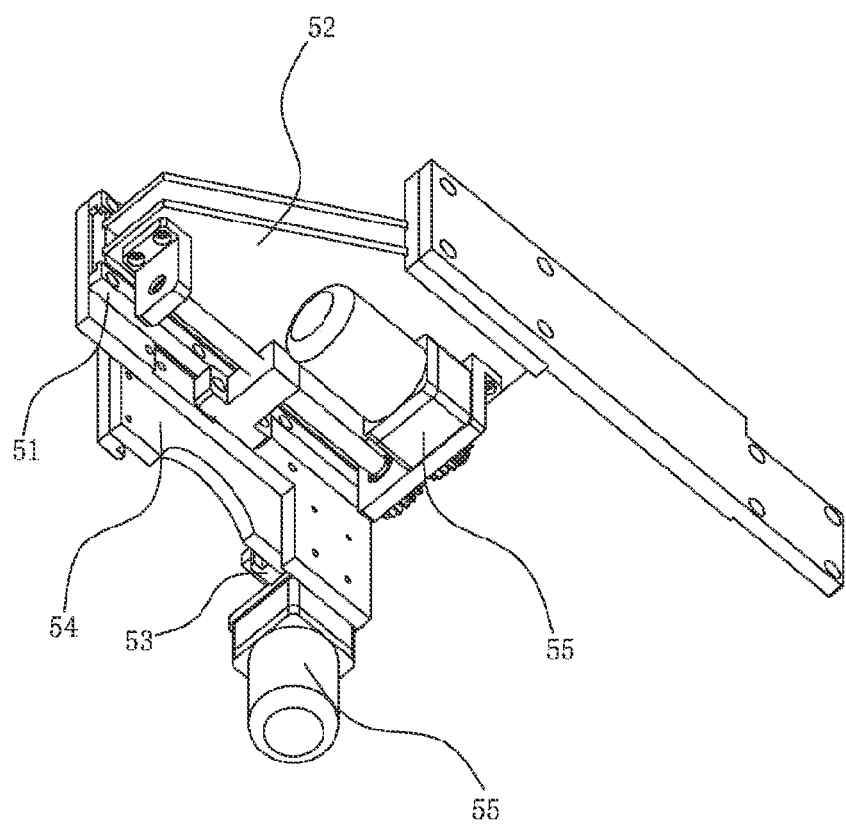
FIG. 21 is a second view showing the transversal guide rail of the winding machine of the disclosure.
Figure 22:
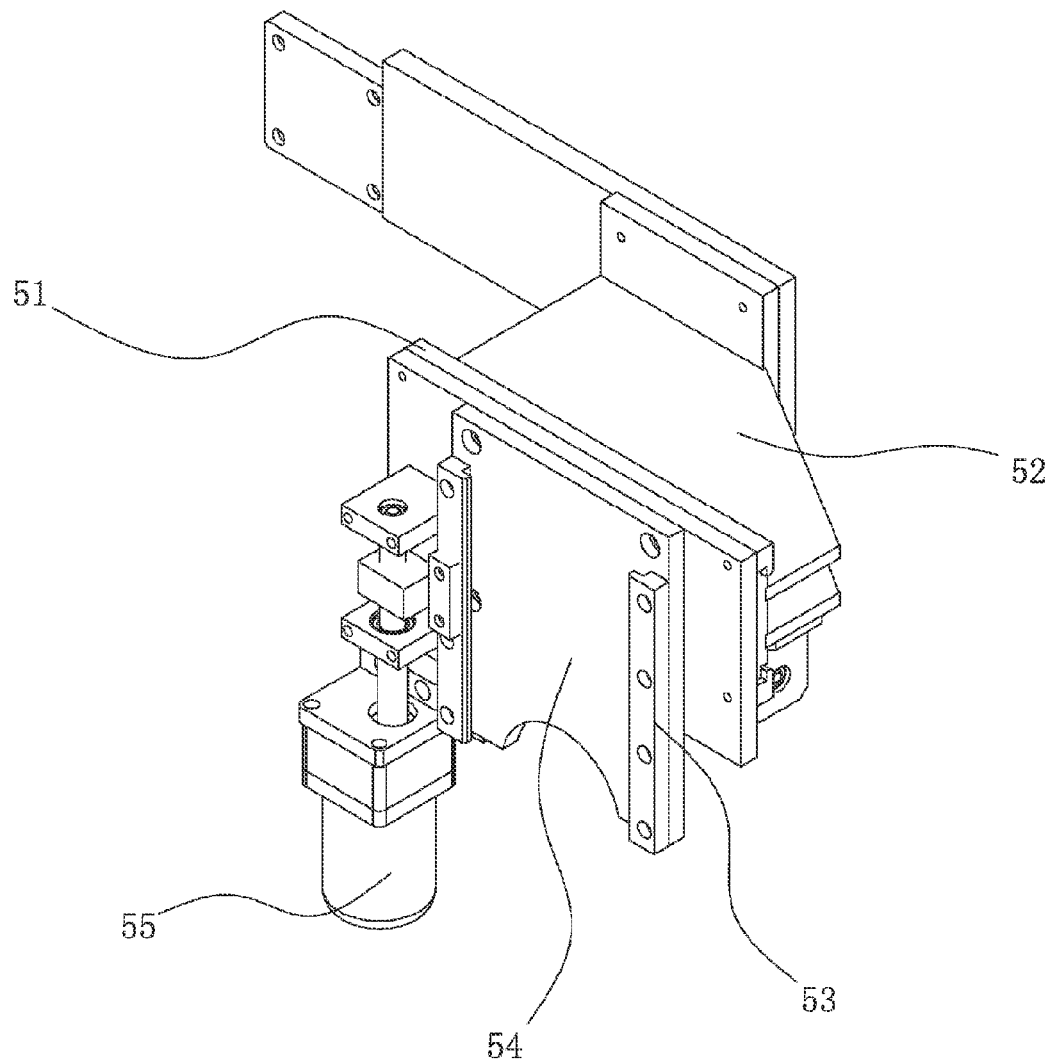
FIG. 22 is drawing view showing a longitudinal guide rail of the winding machine of the disclosure.

Referring to FIG. 18, the winding machine according to the disclosure also includes a clamping mechanism which includes two supports 41' positioned on the body 9 opposite to each other and iron core clamping assemblies 5' positioned on the supports 41'. The supports 41' are connected with the forcipate gear open-close mechanism 2' through a mounting plate. Each of the iron core clamping assemblies 5' includes a base plate 51', at least three mounts 52' positioned on the base plate 51', and a clamping plate 53' positioned on each of the mounts 52'. A slide guide rail 42' is provided between the supports 41' and the body 9. The two supports 41' move relative to each other via the slide guide rail 42'. The structure applies to the three-dimensional iron core at various length, thus expanding the range of application, reducing the equipment input by the enterprises and strengthening the stability and consistency between the supports 2. The disclosure is based on the central shaft-free solution wherein the sliding adjustment of supports is caused by the guide rail, thereby greatly reducing the clamping time for the three-dimensional iron core. Such a central shaft-free structure is suitable for different types of iron core, avoiding the interference of central shaft with the forcipate gear mechanism.

Referring to the FIG. 18, in an embodiment of the winding machine of the disclosure, the supports 41' are provided with a turnover shaft 43', a turnover gear 44' capped on the turnover shaft 43', and a drive gear 45' that drives the turnover gear 44'. The iron core clamping assembly 5' is installed on the turnover shaft 43'. The turnover gear 44' causes the turnover shaft 43' to turn over. Because the iron core clamping assembly 5' is positioned on the turnover shaft 43' and thus is caused to turn over, it is unnecessary to load the iron core repeatedly while replacing the coil of the three-dimensional iron core, thus improving the production efficiency and reducing the workload.

Referring to FIG. 18, in the above embodiment of the disclosure, the body 9 is equipped with a transmission shaft 91. The driving gears 45' on the two supports 41' are connected with the transmission shaft 91. The transmission shaft 91 is used for causing the turnover mechanism on the two opposite supports 41' to synchronous turn over, preventing the three-dimensional iron core from twisting and thus improving product precision.

What is claimed is:
1. An openable forcipate gear mechanism, comprising:
   a circular base spliced by two parts, wherein the circular base is provided with an annular guide rail which is spliced; and
   an annular gear spliced by two parts, wherein the annular gear is mounted on the guide rail and rotates along the guide rail.
2. The openable forcipate gear mechanism according to claim 1, wherein the circular base, the annular guide rail and the annular gear are spliced by two semicircular parts, respectively;
   splicing joints of the circular base, the annular guide rail and the annular gear coincide with each other; and
   the annular guide rail is formed as a rolling guide rail or a slide guide rail.
3. The openable forcipate gear mechanism according to claim 1, wherein the annular guide rail includes an arc-shaped connecting frame positioned on the circular base and a plurality of bearings mounted in the arc-shaped connecting frame and distributed along a circumference;
   the annular gear is formed with an annular groove; and
   the groove is provided at outer and inner rings thereof with slots into which the bearings are clipped.
4. The openable forcipate gear mechanism according to claim 1, wherein the annular guide rail is formed of two semicircular guide rails; and
   the annular gear is provided with an annular groove which is connected with the annular guide rail.
5. The openable forcipate gear mechanism according to claim 1, wherein the annular guide rail includes an arc-shaped support, which is provided with an annular ball backflow channel and balls positioned in the annular ball backflow channel;
   the annular gear is provided with an groove; and
   the groove is provided at inner and outer rings thereof with slots into which the bails are positioned.
6. The openable forcipate gear mechanism according to claim 1, wherein the annular gear is provided at an outer ring thereof with engaging teeth and at an inner ring thereof with a connecting portion suitable for connecting with external parts.
7. A forcipate gear open-close mechanism, comprising:
   a forcipate gear mechanism;
   an opening and dosing device for driving the forcipate gear mechanism; and a power transmission device,
   wherein the forcipate gear mechanism is the forcipate gear mechanism according to claim 1.
8. The forcipate gear open-close mechanism according to claim 7, wherein the opening and dosing device comprises:
   two connecting arms connected with the base spliced by two parts;
   a fixing plate with which the connecting arms articulate; and
   a pushrod connected with the connecting arms and pushing the connecting arms to move.
9. The forcipate gear open-dose mechanism according to claim 8, wherein the fixing plate is provided with a drive motor and a screw driven by the drive motor;
   the pushrod is provided at a central part thereof with a drive nut connected with the screw and at ends thereof with bearings;
   the connecting arms are provided with arc-shaped slots in which the bearings are positioned; and
   the ends of the pushrod are connected with the arc-shaped slots through the bearings and slide along the arc-shaped slots.
10. The forcipate gear open-dose mechanism according to claim 8, wherein the power transmission device comprises:
    a driving gear formed of two plate gears mounted on the fixing plate; and
    two driven gears mounted on the connecting arms, wherein one of the two plate gears has a rotation adjusting and locking structure, the two plate gears are engaged with the two driven gears respectively, and the two driven gears are engaged with the annular gear respectively.

11. The forcipate gear open-dose mechanism according to claim 10, wherein the forcipate gear open-dose mechanism further comprises three structures for detecting and locking open and dose locations, which are connected with the driving gear and the two driven gears respectively;
each of the structures for detecting and locking open and close locations comprises a locking wheel, a locking member for locking the locking wheel, and a mandrel controlling the movement of the locking member;
the locking wheel is provided with a notch and the locking member is provided with a hook;
the hook is clipped into the notch, when the splicing joints of the circular base, the annular guide rail, and the annular gear coincide with each other; and
the mandrel is also connected with sensors.

12. The forcipate gear open-close mechanism according to claim 11, wherein the sensors comprise at least three sensors, one of which is provided at the splicing joint of the circular base, and the rest of which are distributed on the base along the circumference; and
the sensors each comprise a shell fixed on the base, a trigger provided on the shell, and two sensitive switches triggered by the trigger.

13. A winding machine, comprising a body and a forcipate gear open-close mechanism mounted on the body, wherein the forcipate gear open-close mechanism is the forcipate gear open-close mechanism according to claim 7.

14. The winding machine according to claim 13, wherein the winding machine further comprises a locating device which comprises an adjusting structure with longitudinal and transversal movements and a control device controlling the adjustment structure, the adjusting structure comprising:
a transversal guide rail connected with the body;
a transversal connecting plate mounted on the transversal guide rail;
a longitudinal guide rail provided on the transversal connecting plate;
a longitudinal connecting plate mounted on the longitudinal guide rail; and
a motor actuating the transversal connecting plate and the longitudinal connecting plate,
wherein the forcipate gear mechanism is mounted on the longitudinal connecting plate.

15. The winding machine according to claim 13, wherein the winding machine further comprises a flexible power transmission mechanism which comprises a first transmission arm connected with a power output shaft and a second transmission arm connected with a winding mechanism, ends of the first transmission arm and the second transmission arm being articulated.

16. The winding machine according to claim 15, wherein each of the first and second transmission arms comprises a connecting plate, a chain wheel set mounted on two ends of the connecting plate via a rotation shaft, and a chain connecting the chain wheel set;
an articulating point of the first and second transmission arms is located at the chain wheel sets where the first and second transmission arms are connected; and
a plurality of flexible power transmission mechanisms composes a multi-row structure.

17. The winding machine according to claim 13, wherein the winding machine further comprises a clamping mechanism, the clamping mechanism comprising two supports positioned on the body opposite to each other and iron core clamping assemblies positioned on the supports;
a slide guide rail is provided between the supports and the body; and
the two supports move relative to each other via the guide rail.

* * * * *